(12) United States Patent
Hirata et al.

(10) Patent No.: US 7,514,047 B2
(45) Date of Patent: Apr. 7, 2009

(54) EXHAUST GAS PURIFYING APPARATUS

(75) Inventors: Hirohito Hirata, Suntou-gun (JP);
Masaru Kakinohana, Susono (JP);
Hideo Yahagi, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 847 days.

(21) Appl. No.: 10/753,362

(22) Filed: Jan. 9, 2004

(65) Prior Publication Data

US 2004/0141890 A1    Jul. 22, 2004

(30) Foreign Application Priority Data

Jan. 15, 2003 (JP) ............................. 2003-006989
Mar. 3, 2003 (JP) ............................. 2003-055756
Mar. 5, 2003 (JP) ............................. 2003-058836

(51) Int. Cl.
*B01J 19/08* (2006.01)
(52) U.S. Cl. .................... 422/186.04; 60/275
(58) Field of Classification Search ............ 422/186.04; 60/275
See application file for complete search history.

(56) References Cited

U.S. PATENT DOCUMENTS

| 5,950,424 | A | 9/1999 | Nojima |
| 6,475,350 | B2 * | 11/2002 | Palekar et al. ............... 204/164 |
| 6,517,786 | B1 | 2/2003 | Best et al. |
| 6,558,637 | B2 * | 5/2003 | Tamura et al. ......... 422/186.04 |
| 6,803,236 | B2 * | 10/2004 | Bailey et al. .................. 436/37 |
| 2004/0079631 | A1 | 4/2004 | Birckigt et al. |

FOREIGN PATENT DOCUMENTS

| CN | 1260735 A | 7/2000 |
| DE | 197 17 889 C1 | 4/1999 |
| DE | 197 17 890 C1 | 4/1999 |
| DE | 100 57 862 C1 | 2/2002 |
| EP | 0 160 482 A2 | 11/1985 |
| EP | 0 526 552 B1 | 12/1993 |
| EP | 1 224 969 A1 | 7/2002 |
| EP | 1 384 508 A1 | 1/2004 |
| JP | A 60-235620 | 11/1985 |
| JP | A 6-146852 | 5/1994 |
| JP | A-09-151722 | 6/1997 |

(Continued)

OTHER PUBLICATIONS

JIAO; "The Development and Challenging Problems in Dealing with the Gases Exhaust from Diesel Engine"; pp. 16-18, 2002. (with partial translation).

*Primary Examiner*—Kishor Mayekar
(74) *Attorney, Agent, or Firm*—Oliff & Berridge, PLC

(57) ABSTRACT

The present invention relates to an exhaust gas purifying apparatus, for trapping and burning PM, which comprises electrodes and an insulative honeycomb structure. The apparatus is characterized in that the electrodes make an electric field in the honeycomb structure, the electric field not being parallel with the cell passages of the honeycomb structure. Further the apparatus is characterized in that the electrodes make an electric field in the honeycomb structure, and that the honeycomb structure carries at least one metal selected from the group consisting of an alkali metal and an alkali earth metal; a material that generates oxygen radical by conducting an electric current therethrough; a manganese dioxide; and/or a material having a high dielectric constant.

21 Claims, 10 Drawing Sheets

FOREIGN PATENT DOCUMENTS

| | | |
|---|---|---|
| JP | B2 2698804 | 9/1997 |
| JP | A 9-329015 | 12/1997 |
| JP | A-2000-213331 | 8/2000 |
| JP | A-2001-221032 | 8/2001 |
| JP | A 2001-511493 | 8/2001 |
| JP | A-2002-153749 | 5/2002 |
| JP | A-2002-177815 | 6/2002 |
| JP | A-2002-326034 | 11/2002 |
| JP | A-2003-003824 | 1/2003 |
| WO | WO 91/16528 A1 | 10/1991 |
| WO | WO 97/30274 A1 | 8/1997 |
| WO | WO 98/50151 A1 | 11/1998 |
| WO | WO 99/05400 | 2/1999 |
| WO | WO 02/087731 A1 | 11/2002 |

* cited by examiner

EXHAUST GAS PURIFYING APPARATUS

BACKGROUND OF THE INVENTION

1. Field of the Invention

The present invention relates to an apparatus for purifying exhaust gas from internal combustion engine and, in particular, to an apparatus for purifying the PM (particulate matter) emitted from a diesel engine.

2. Description of Related Art

A diesel engine is usually used for motor vehicles, particularly for large-size motor vehicles. Recently, it is required to reduce nitrogen oxide, carbon monoxide and hydrocarbon as well as the PM in the exhaust gas from the diesel engine. For this purpose, it is considered to improve an engine or optimize a combustion condition for controlling the generation of the PM, and to purify the generated PM in an exhaust gas.

For removing the PM in an exhaust gas, a ceramic honeycomb filter having a number of cell passages (cell channels), a metal filter and a ceramic fiber filter that trap the PM are generally used. However, in the case of using such a filter, the trapped PM gradually blocks the filter and, further, the filter increases the gas-flow resistance and becomes a larger load on the engine. Further, a nano-size PM tends to pass through the filter and is not trapped. In the case that the filter traps the PM in the exhaust gas, it is difficult to sufficiently burn out the trapped PM on the filter using only the thermal energy of the exhaust gas.

It is well known to use an apparatus that provides an electric discharge for purifying an exhaust gas from diesel engine. For example, Japanese Patent No. 2698804 discloses an apparatus comprising a needle electrode, a deflection electrode, and a trapping electrode surrounding them. The apparatus electrically charges the PM in an exhaust gas from a diesel engine by an electric discharge between the electrodes, and thereby traps the PM on the trapping electrode. However, this apparatus is intended to trap the PM and does not burn the trapped PM. Therefore, the apparatus does not sufficiently burn the trapped PM, and an special treatment is necessary to do it. This is because an electric current passes through the metal trapping electrode rather than the PM deposited on it and, therefore, it is impossible to burn the PM by the electric current.

Further, Japanese National Publication No. 2001-511493 describes an exhaust gas purifying apparatus that comprises insulative pellets between electrodes. However, this apparatus is intended to put an electric power supply close to a reaction furnace, in particular to put the electric power supply into an electrically conductive vessel which is grounded (earthed). Therefore, this reference does not disclose the importance of the angle of the electric field to the direction of the exhaust gas flow, and an importance of the insulative body through which the exhaust gas passes.

Japanese Unexamined Patent Publication No. 60-235620 describes a diesel particulate filter carrying a mixture of a platinum group element and an alkali earth metal oxide for burning the PM trapped on the filter. However, this reference does not describe providing an electric field in the filter, and to combine the electric field and the mixture of platinum group element and alkali earth metal oxide.

Therefore, the exhaust gas purifying apparatuses in the prior arts do not sufficiently use an electric field for trapping the PM, or do not sufficiently burn the trapped PM.

BRIEF SUMMARY OF THE INVENTION

The present invention relates to an exhaust gas purifying apparatus for trapping and burning PM which comprises electrodes and an insulative honeycomb structure having a number of cell passages. The apparatus is characterized in that the electrodes make an electric field in the honeycomb structure, the electric field being non-parallel, particularly at the angle of at least 45 or 60 degree, more particularly substantially perpendicular to the direction of the cell passages of the honeycomb structure.

According to the present invention, the PM in the exhaust gas passing through the cell passages of the honeycomb structure is deposited onto the sidewalls of the cell passages of the honeycomb structure by the Coulomb force between it and the electric field that is not parallel with the direction of the cell passages of the honeycomb structure. Further, the PM deposited in the honeycomb structure is burned with the use of thermal energy of an exhaust gas and also an electrical current that passes through the deposited PM rather than the insulative honeycomb structure.

The PM may be electrically charged by any suitable means such as electric discharge electrode upstream of the honeycomb structure, and/or by the electric field in the honeycomb structure, although the PM is naturally somewhat electrically charged without any particular treatment.

In one aspect of the apparatus of the present invention, the electrodes comprise a center electrode and an outer electrode surrounding the center electrode, and the honeycomb structure is positioned between the center and the outer electrodes.

According to this aspect, the PM in the exhaust gas passing through the cell passages of the honeycomb structure is radially forced toward the center electrode and/or the outer electrode to be deposited onto the sidewalls of the cell passages by the Coulomb force between it and the electric field between the center and the outer electrodes.

In another aspect of the apparatus of the present invention, the electrodes comprise a mesh electrode on the upstream end of the honeycomb structure, and an outer electrode around the circumference surface of the honeycomb structure.

According to this aspect, the PM in the exhaust gas passing through the honeycomb structure is electrically charged by the contact with the mesh electrode and the electric field in the honeycomb structure, and then deposited onto the sidewalls of the cell passages of the honeycomb structure by the Coulomb force between it and the electric field provided between the mesh and the outer electrode.

In this aspect, the electrodes may further comprise a second mesh electrode on the downstream end of the honeycomb structure, the second mesh electrode being electrically connected with the outer electrode.

In another aspect of the apparatus of the present invention, the electrodes comprise a center electrode and an outer electrode surrounding the center electrode; the honeycomb structure is positioned between the center and the outer electrodes; the center electrode extends beyond the upstream end of the honeycomb structure; and the radially inner area of the honeycomb structure has a lower gas-flow resistivity than that of the radially outer area thereof.

In this aspect, the radially inner area may be a perforated hole which goes through the honeycomb structure.

According to this aspect, the radially inner area having lower gas-flow resistivity decreases a pressure drop through the honeycomb structure, while the PM in the exhaust gas passing through the honeycomb structure is forced toward the outer electrode and deposited in the radially outer area of the honeycomb structure by the Coulomb force between it and the electric field provided between the center and the outer electrodes.

In above aspects, the outer electrode may be grounded to prevent an electric discharge to the surroundings.

In another aspect of the apparatus of the present invention, the honeycomb structure has opposite outer surfaces, and the electrodes comprise a pair of plate electrodes respectively placed on the opposite outer surfaces.

According to this aspect, the PM in the exhaust gas passing through the cell passages of the honeycomb structure is forced toward any of the plate electrodes to be deposited onto the sidewalls of the cell passages by the Coulomb force between it and the electric field provided between the plate electrodes.

In this aspect, the apparatus may comprise two or more sets of the honeycomb structure and the pair of plate electrodes respectively placed on the opposite outer surfaces thereof. Therefore, the set of the honeycomb structure and the pair of plate electrodes may be aligned in parallel to one or more other sets. In this case, the plate electrode between the honeycomb structures may be sheared among the adjacent sets.

According to this aspect, the distance between the plate electrodes can be narrowed such that a stronger electric field is obtained with a lower voltage. Specially, the electric field strength is proportional to the voltage between the electrodes, and is inversely proportional to the distance therebetween. Therefore, a desired electric field strength may be obtained with half the voltage if the distance between the electrodes is halved.

Further, in this aspect, the plate electrodes may be powered by an AC electric power supply.

According to this aspect, the positively or negatively charged PM in the exhaust gas flow is forced toward alternative directions in order to evenly deposited on the sidewalls of the cell passages of the honeycomb structure. That is, in this aspect, the PM in the exhaust gas flow is deposited onto one sidewall, while the deposited PM is burned on the other sidewall. This prevents the deposited PM pluging the honeycomb structure.

In another aspect of the apparatus of the present invention, the honeycomb structure has two pairs of opposite outer surfaces, particularly is in a rectangular parallelepiped form; the electrodes comprise two pairs of opposite plate electrodes; and each the pair of opposite plate electrodes is placed on each pair of the opposite outer surfaces, particularly on the opposite outer surface which is parallel to the direction of the cell passages of the honeycomb structure such that the two pairs of opposite plate electrodes can make the alternative electric fields in two different directions which are non-parallel, particularly at the angle of at least 45 or 60 degree, more particularly substantially perpendicular to the direction of the cell passages of the honeycomb structure.

According to this aspect, the alternative electric fields in two different directions alternatively change the sidewalls on which the PM is deposit, such that the PM is evenly deposited on the sidewalls of the cell passages of the honeycomb structure.

In this aspect, the plate electrodes may be powered by an AC electric power supply.

According to this aspect, the positively or negatively charged PM in the exhaust gas flow is forced toward alternative direction in order to be evenly deposited on the sidewalls of the cell passages of the honeycomb structure. That is, in this aspect, the PM in the exhaust gas flow is deposited onto one sidewall, while the deposited PM is burned on the other sidewall. This prevents the deposited PM pluging the honeycomb structure.

In any of above aspects, the exhaust gas purifying apparatus may have an electric discharge electrode at the upstream of the honeycomb structure in order to promote the electrification (electric charge) of the PM and the coulombical deposition of the PM in the honeycomb structure.

The electric discharge electrode may be electrically connected with the electrodes which provide an electric field in the honeycomb structure, e.g. the outer or center electrode. That is, the electric discharge electrode may be a part of the center electrode wherein the part extends beyond the upstream end of the honeycomb structure. The electric discharge electrode may have antenna-like electrode, particularly needle electrode in order to promote the electric discharge and then the electrical charge of the PM.

The present invention relates to an exhaust gas purifying apparatus for trapping and burning PM which comprises electrodes and an insulative honeycomb structure. The apparatus is characterized in that the electrodes make an electric field in the honeycomb structure, and that the honeycomb structure carries at least one metal selected from the group consisting of alkali metal and alkali earth metal.

According to the present invention, the burning of the PM trapped in the honeycomb structure is accelerated. This appears to be because that the alkali metal and/or alkali earth metal carried on the honeycomb structure stores the NOx in the exhaust gas to form a nitrate such that the burning out of the PM is accelerated by (1) the oxidizing chemical species such as $NO_2$ emitted from the nitrate by conducting an electric current therethrough, (2) the nitrate ion produced by the reaction between the nitrate and the water vapor in the exhaust gas, and/or (3) the nitrate itself having lower melting point which melts to improve the contact with the PM by thermal energy of the exhaust gas.

The present invention relates to an exhaust gas purifying apparatus for trapping and burning PM which comprises electrodes and an insulative honeycomb structure. The apparatus is characterized in that the electrodes make an electric field in the honeycomb structure, and that the honeycomb structure carries a material which generates an oxygen radical by conducting an electric current therethrough, e.g. $12CaO.7Al_2O_3$.

According to the present invention, burning of the PM trapped in the honeycomb structure is accelerated. This appears to be because that the oxygen radical having strong oxidizing ability accelerates the burning out of the PM.

The present invention relates to an exhaust gas purifying apparatus for, trapping and burning PM which comprises electrodes and an insulative honeycomb structure. The apparatus is characterized in that the electrodes make an electric field in said honeycomb structure, and that the honeycomb structure carries a manganese dioxide ($MnO_2$).

According to the present invention, burning of the PM trapped in the honeycomb structure is accelerated. This appears to be because that an electric discharge generated by the electric field in the honeycomb structure produces an ozone, and the ozone decomposes on the $MnO_2$ to produce an oxygen radical. The oxygen radical has a strong oxidizing ability to accelerate the burning out of the PM.

The present invention relates to an exhaust gas purifying apparatus for trapping and burning PM which comprises electrodes and an insulative honeycomb structure. The apparatus is characterized in that the electrodes make an electric field in said honeycomb structure, and that the honeycomb structure carries a material having high dielectric constant, e.g. ferroelectrics such as barium titanate and strontium titanate.

The term "a material having high dielectric constant" means a material having an at least 10 times higher static (i.e. at a constant voltage) specific dielectric constant at the working temperature of the apparatus (e.g. at the temperature of 250° C.) than that of the material of which the honeycomb structure is made. The cordierite that is usually used for making the insulative honeycomb structure has a specific dielectric constant of less than 10, especially 4 to 6. The material having high dielectric constant may be a material having a static specific dielectric constant at the above temperature of more than 100, especially more than 500, more especially more than 1000.

According to the present invention, trapping of the PM at the honeycomb structure is accelerated. This appears to be because the material having high dielectric constant carried by the honeycomb structure allows the honeycomb structure to have a larger electric charge thereby improves trapping of the PM in the honeycomb structure.

In above aspects, the honeycomb structure may carry a PM oxidation catalyst for burning the PM deposited in the honeycomb structure. The catalyst includes $CeO_2$, $Fe/CeO_2$, $Pt/CeO_2$, and $Pt/Al_2O_3$, and combinations thereof.

Above characters of the exhaust gas purifying apparatuses of the present invention can be optionally combined. For example, any of the present apparatuses comprise a honeycomb structure which carries at least one metal selected from the group consisting of alkali metal and alkali earth metal; at least one material that generates an oxygen radical by conducting an electric current therethrough; the manganese dioxide; the material having high dielectric constant; and/or the PM oxidizing catalyst.

In the case that the present apparatus is used to generate an electric discharge, it is possible to trap the PM in the honeycomb structure and, further, to generate strongly oxidative chemical species, e.g. active oxygen, ozone, NOx, oxygen radical, NOx radical such that the burning out of the trapped PM is accelerated. Further, it is possible to generate a plasma by the use of high voltage to promote the trapping and burning out of the PM.

These and other objects, features and advantages of the present invention will become apparent to a person with ordinary skilled in the art upon reading the following detailed description along with the drawings.

DETAILED DESCRIPTION OF THE INVENTION

The present invention is described regarding embodiments and drawings which are not intended to limit the scope of the present invention shown in the claims.

[Apparatus 1]

Figure 1A:
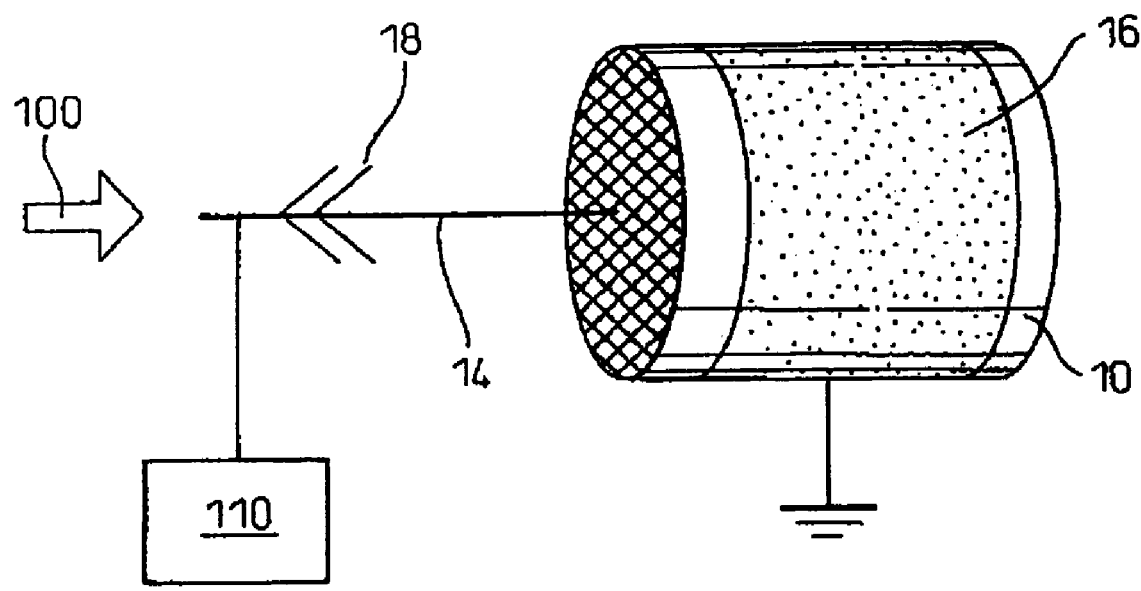
FIGS. 1a and 1b are respectively a perspective view and a cross sectional view of the exhaust gas purifying apparatus according to the first embodiment of present invention.

The first embodiment of the present exhaust gas purifying apparatus is described below. FIG. 1a shows a perspective view and FIG. 1b shows a side sectional view of the first embodiment of the present apparatus.

Figure 1B:
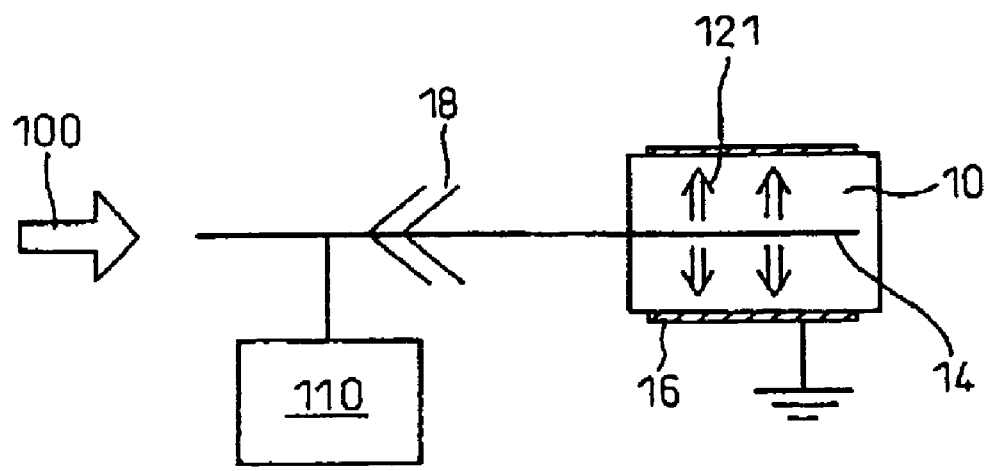

In FIGS. 1a and 1b, 10 indicates a straight-flow type insulative honeycomb structure having a number of cell passages, 14 indicates a center electrode, 16 indicates an outer electrode, 18 indicates needle electrodes on the center electrode 14, and 110 indicates a power supply. The insulative honeycomb structure 10 is positioned between the center 14 and the outer 16 electrodes such that these electrodes are electrically insulated. An exhaust gas containing PM flows from the left side to the right side of the FIGS. 1a and 1b as indicated by an arrow 100, and passes through the cell passages of the honeycomb structure 10 surrounded by the outer electrode 16.

In the use of the exhaust gas purifying apparatus shown in FIGS. 1a and 1b, the electric power supply 110 applies a voltage between the center electrode 14 and the outer electrode 16 to generate a radial electric field 121 in the honeycomb structure 10. That is, an electric field 121 in the traverse direction of cell passages of the honeycomb structure is generated in the honeycomb structure 10. The electric field 121 forces the PM in the exhaust gas to be deposited onto the sidewalls of the cell passages of the honeycomb structure 10, and thereby promotes the trapping of the PM.

The components of the exhaust gas purifying apparatus shown in FIGS. 1a and 1b are described below in more detail.

The insulative honeycomb structure 10 may be made of a ceramic material, e.g. cordierite. The honeycomb structure may be a straight-flow type (i.e. a honeycomb structure of which cell passages are substantially not plugged) or wall-flow type (i.e. a honeycomb structure of which cell passages are alternatively plugged, so-called "diesel particulate filter"). According to this embodiment, the straight-flow type honeycomb structure is preferable for gas-flow resistance, and can achieve a sufficient PM trapping. Further, the wall-flow type honeycomb structure is preferable for producing PM path, and then burning the trapped PM by the electric current therethrough. The insulative honeycomb structure may be sufficiently more insulative than PM in order to make sure that an electric current passes through the deposited PM than the honeycomb structure and burn out the PM.

The center electrode 14 is made of a material that makes it possible to apply a voltage between the center electrode 14 and the outer electrode 16. The material may be electrically conductive material, electrically semi-conductive material etc. and especially, a metal such as Cu, W, stainless steel, Fe, PT and Al, the stainless steel being most preferable due to its durability and low cost. The center electrode 14 may usually be a metal wire, but it may be a hollow bar.

The outer electrode 16 is made of a material that makes it possible to apply a voltage between the center electrode 14 and the outer electrode 16. The material may be electrically conductive material, electrically semi-conductive material etc., and especially, a metal such as Cu, W, stainless steel, Fe, Pt and Al, the stainless steel being most preferable due to its durability and low cost. The outer electrode 16 may be made by surrounding a mesh or foil of these materials around the honeycomb structure 10, or by applying a conductive paste on the circumference surface of the honeycomb structure 10.

The electric power supply 110 may be one supplying a pulse or constant direct current (DC), or alternating current (AC) voltage. A voltage applied between the center electrode 14 and the outer electrode 16 may usually be more than 1 kV, preferably more than 10 kV. The pulse period of the applied voltage is preferably less than 1 ms (milli-second), more preferably less than 1 μs (micro-second). The center electrode 14 may be a cathode or anode. Preferably, the center electrode 14 is anode, and the outer electrode 16 is cathode. The outer electrode 16 may be electrically connected with the electric power supply 110 to be applied an opposite voltage to that of the center electrode 14, although the outer electrode 16 in FIGS. 1*a* and 1*b* is grounded.

At the upstream of the honeycomb structure 10, the exhaust gas purifying apparatus shown in FIGS. 1*a* and 1*b* has needle electrodes 18 for an electric discharge. Once the needle electrodes are powered by the power supply 110 they promote an electric discharge therefrom and then an electric charge of the PM. This further improve the trapping of the PM in the honeycomb structure 10. The needle electrodes 18 are made of a material which makes it possible to stably generate an electric discharge between the needle electrodes 18 and the outer electrode 16. The material may be electrically conductive material, electrically semi-conductive material and etc., specially metal such as Cu, W, stainless steel, Fe, Pt and Al, the stainless steel being most preferable due to its durability and low cost. The needle electrodes 18 are directed toward the outer electrode 16. If the number of the needle electrodes 18 is too few, it is difficult to maintain an uniform electric discharge between the needle electrodes 18 and the outer electrode 16. Therefore, a significant number of needle electrodes are necessary. The optimal number of the needle electrodes may be determined such that the PM in an exhaust gas flow may be preferably electrified (charged). The electric power supply 100 applies a voltage between the needle electrodes 18 and the outer electrode 16 to produce an electric discharge therebetween.

The electric power supply 110 may apply a DC voltage, AC voltage, a voltage having a periodic waveform, and etc between the electrodes. Preferably, DC pulse voltage is applied since it can generate a stable corona electric discharge. The applied voltage, pulse width and pulse period of the DC pulse voltage may be optionally determined as long as it generates a corona electric discharge. Preferably, the applied voltage and pulse period are respectively a high voltage and short period in order to generate a corona electric discharge, though those parameters may be restricted by the design of the apparatus, an economical interest and etc.

The insulative honeycomb structure 10 may carry any material that is effective for trapping and/or burning the PM. The material includes at least one metal selected from the group consisting of alkali metal and alkali earth metal; at least one material which generates oxygen radical by conducting an electric current therethrough; the manganese dioxide ($MnO_2$); the material having a high dielectric constant; and/or the PM oxidizing catalyst such as Pt, $CeO_2$, $Fe/CeO_2$, $Pt/CeO_2$ and $Pt/Al_2O_3$, and combinations thereof.

The honeycomb structure carrying one or more of these materials may be obtained by any procedure, e.g. a wash coating process. Any amount of the materials can be carried on the honeycomb structure. Once the wash coating process is used for the metal oxide catalyst to be carried by the honeycomb structure, the honeycomb structure is preferably fired. The firing conditions are well-known by a person with ordinary skilled in the art, and preferably include a firing temperature of 450 to 500° C. (Celsius degrees). In the case of the PM oxidizing catalyst, the firing of the honeycomb structure carrying the catalyst improves an effect of burning PM.

[Apparatus 2]

Figure 2A:
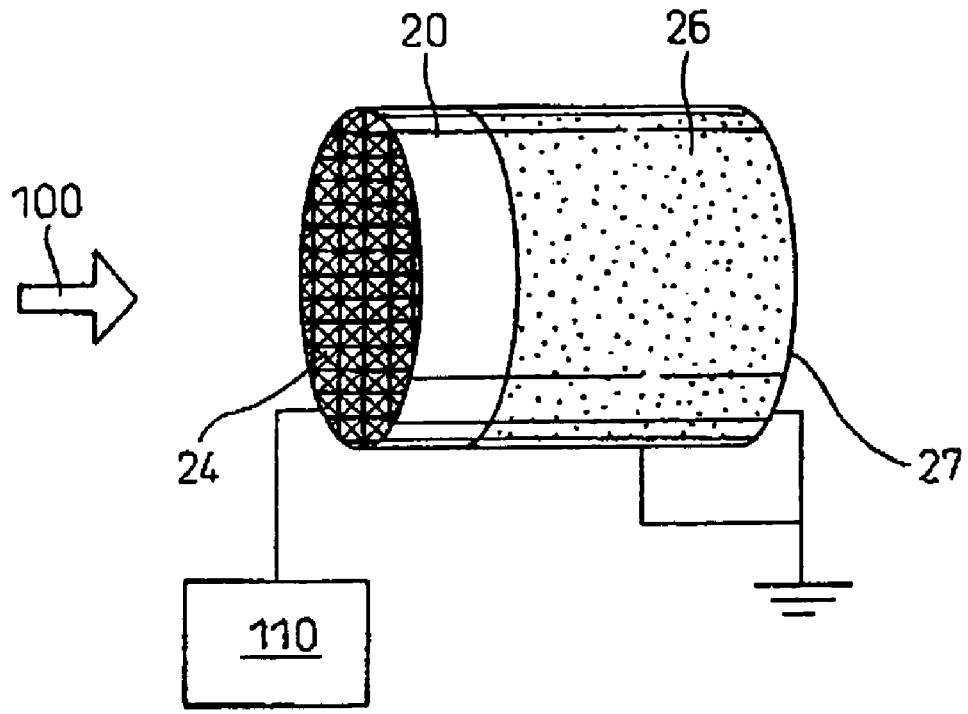
FIGS. 2a and 2b are respectively a perspective view and cross sectional view of the exhaust gas purifying apparatus according to the second embodiment of present invention.

The second embodiment of the present exhaust gas purifying apparatus is described below. FIG. 2*a* shows a perspective view and FIG. 2*b* shows a side sectional view of the second embodiment of the present apparatus.

Figure 2B:
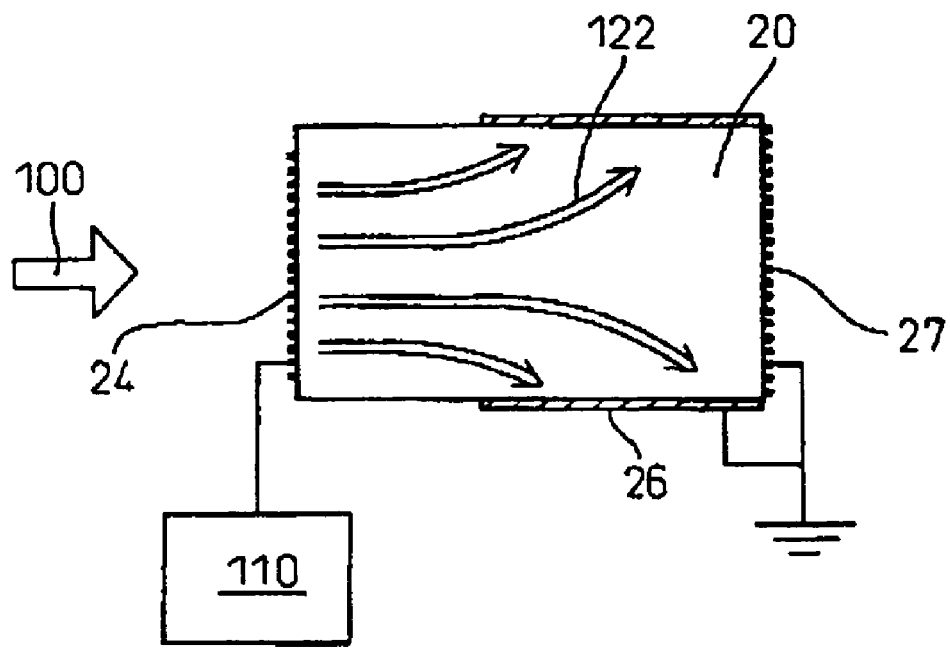

In FIGS. 2*a* and 2*b*, 20 indicates a straight-flow type insulative honeycomb structure having a number of cell passages, 24 indicates an upstream mesh electrode, 26 indicates an outer electrode, 27 indicates a downstream mesh electrode, and 110 indicates an electric power supply. The outer electrode 26 is electrically connected with the downstream mesh electrode 27. The upstream mesh electrode 24 is electrically insulated with the outer electrode 26 and the downstream mesh electrode 27 by the insulative honeycomb structure 20 positioned therebetween. An exhaust gas containing PM flows from the left side to the right side of the FIGS. 2*a* and 2*b* as indicated by an arrow 100, and passes through the cell passages of the honeycomb structure 20 surrounded by the outer electrode 26.

In the use of the exhaust gas purifying apparatus shown in FIGS. 2*a* and 2*b*, the electric power supply 110 applies a voltage between the upstream mesh electrode 24 and the set of the outer electrode 26 and downstream mesh electrode 27 to generate an electric field 12 in the honeycomb structure 20 therebetween. As shown in FIG. 2*b*, the electric field 122 goes from the upstream mesh electrode 24 to the outer electrode 26 and downstream mesh electrode 27. The electric field 122 forces the PM in the exhaust gas to be deposited onto the sidewalls of the cell passages of the honeycomb structure 20 such that the PM trapping is promoted. An electric discharge may be generated between the upstream mesh electrode 24 and the set of the outer electrode 26 and downstream mesh electrode 27 to electrify the PM such that the PM trapping effect in the honeycomb structure 20 is improved.

The components of the exhaust gas purifying apparatus shown in FIGS. 2*a* and 2*b* are described below in more detail.

The upstream mesh electrode 24, the outer electrode 26 and the downstream mesh electrode 27 may be made of the materials described above, e.g. for the center electrode 14 of FIGS. 1*a* and 1*b*. That is, the outer electrode 26 may be made by surrounding a mesh or foil of these materials around the circumference of the honeycomb structure 20, or by applying a conductive paste on the outer circumference surface of the honeycomb structure 20. The insulative honeycomb structure 20, the electric-power supply 110, materials carried on the honeycomb structure 20 are similar to those described for the apparatus of FIGS. 1*a* and 1*b*.

[Apparatus 3]

Figure 3A:
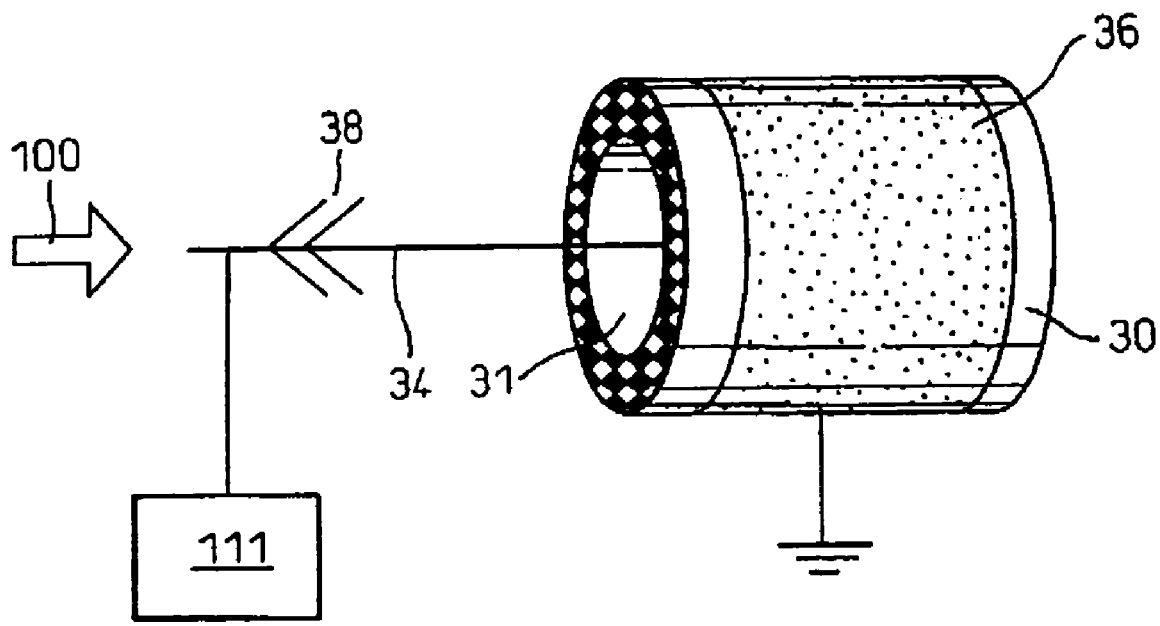
FIGS. 3a and 3b are respectively a perspective view and a cross sectional view of the exhaust gas purifying apparatus according to the third embodiment of present invention.

The third embodiment of the present exhaust gas purifying apparatus is described below. FIG. 3*a* shows a perspective view and FIG. 3*b* shows a side sectional view of the third embodiment of the present apparatus.

Figure 3B:
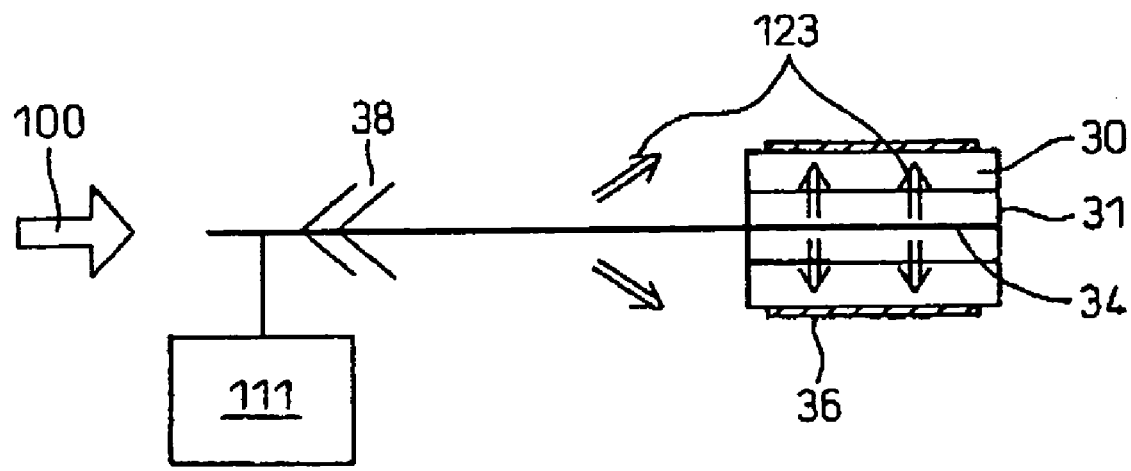

In FIGS. 3*a* and 3*b*, 30 indicates a wall-flow type insulative honeycomb structure having a number of cell passages, 31 indicates a perforated hole at the radially inner area of the honeycomb structure 30, 34 indicates a center electrode, 36 indicates an outer electrode, 38 indicates needle electrodes on the center electrode 34, and 111 indicates a DC power supply. The center electrode 34 is electrically insulated with the outer electrode 36 by the insulative honeycomb structure 30 therebetween. An exhaust gas containing PM flows from the left side to the right side of the FIGS. 3a and 3b as indicated by an arrow 100, and passes through the cell passages and the perforated hole 31 of the honeycomb structure 30 surrounded by the outer electrode 36.

In the use of the exhaust gas purifying apparatus shown in FIGS. 3a and 3b, the electric power supply 111 applies a voltage between the center electrode 34 and the outer electrode 36 to generate an electric field 123 in the cell passages and the perforated hole 31 of honeycomb structure 30 and at the upstream thereof. The electric field 123 at the upstream of the honeycomb structure 30 forces the PM in the exhaust gas to pass through the cell passages at the radially outer side of the honeycomb structure 30 rather than the perforated hole 31. The honeycomb structure 30 traps the PM with the aid of an electric field 123. It is possible to sufficiently trap the PM with a lower gas-flow resistivity according to this mechanism, as the exhaust gas mainly containing the PM passes through the cell passages while the exhaust gas containing less PM passes through the perforated hole 31 at the radially inner area of the honeycomb structure 30.

The components of the exhaust gas purifying apparatus shown in FIGS. 3a and 3b are described below in more detail.

The insulative honeycomb structure 30 may be made of the same material described for that of the apparatus of FIGS. 1a and 1b. The honeycomb structure 30 may be straight-flow type or wall-flow type. Due to the perforated hole 31, the wall-flow type is acceptable regardless of its larger gas-flow resistivity and preferable for the PM to be trapped. The perforated hole 31 may have any suitable diameter, e.g. the ratio of the diameter of the honeycomb structure 30 to that of the perforated hole 31 may be 10:1 to 2:1. The DC power supply 111 may be any suitable electric power supply that provides a voltage, pulse period and etc. suitable for forcing the PM toward the radially outside to pass the cell passages. The center electrode 34 and outer electrode 36 may be made as described above for these of FIGS. 1a and 1b. The materials carried on the honeycomb structure 30 are similar to those described for the apparatus of FIGS. 1a and 1b.

[Apparatus 4]

Figure 5:
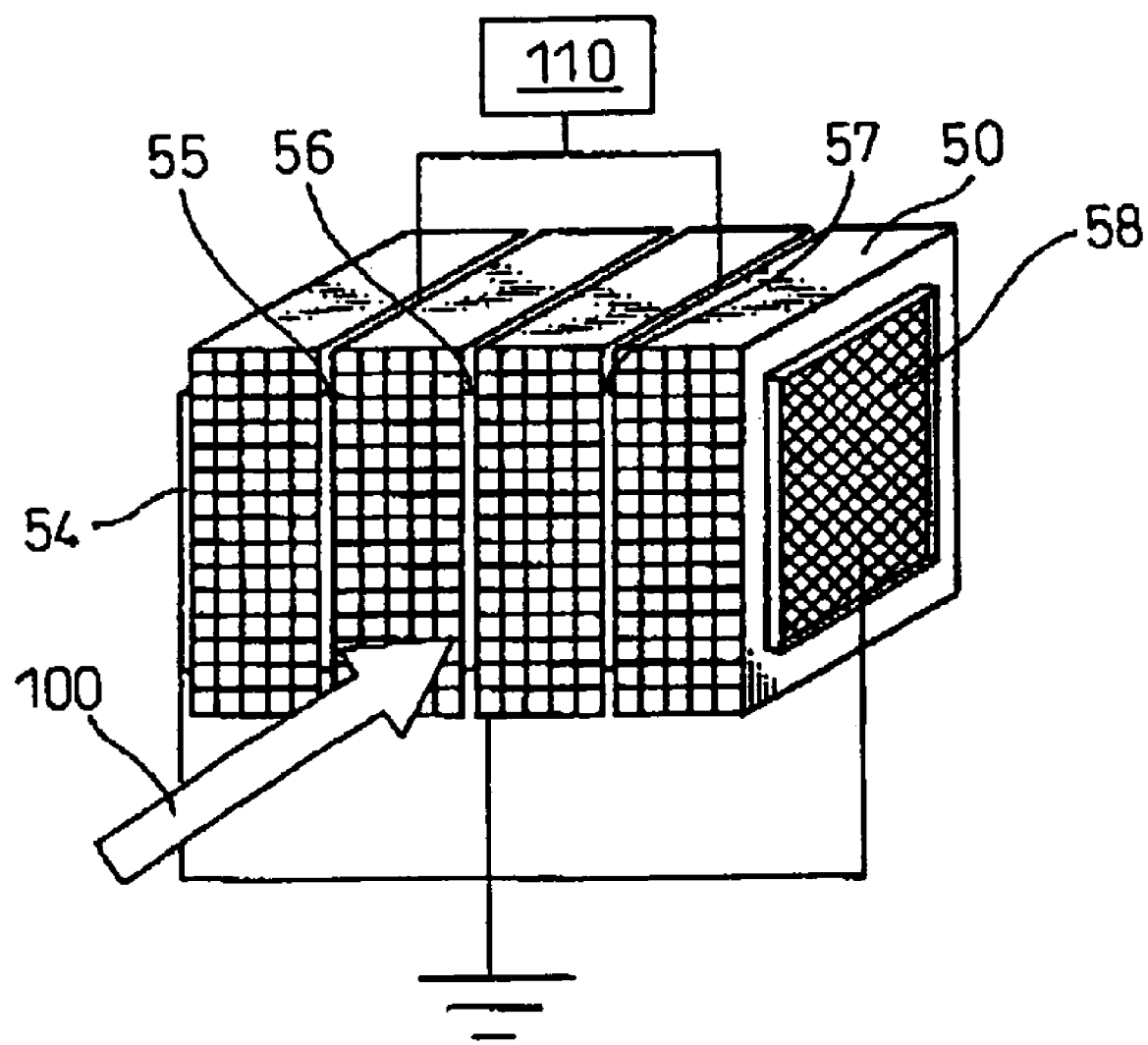
FIG. 5 is a perspective view of the exhaust gas purifying apparatus according to the fourth embodiment of the present invention.

The forth embodiment of the present exhaust gas purifying apparatus is described below. FIGS. 5 to 6b are a perspective view and elevational views of the upstream end of the apparatus, respectively.

In FIGS. 5 to 6b, 50 indicates a straight-flow type insulative honeycomb structure having a number of cell passages, 54 to 58 indicate mesh plate electrodes, 110 indicates an electric power supply, and 125 and 126 indicate arrows showing directions of the electric fields in the honeycomb structure 50. Among the plate electrodes 54 to 58, the plate electrodes 55 and 57 are connected to the electric power supply 110, and the plate electrodes 54, 56 and 58 are grounded. Each of the plate electrodes 54 to 58 is electrically insulated with adjacent ones by the insulative honeycomb structure 50 therebetween. An exhaust gas containing PM passes through the cell passages of the insulative honeycomb structures 50 sandwiched between the plate electrodes 54 to 58, as shown in an arrow 100.

The apparatus shown in FIGS. 5 to 6b comprises four sets of the honeycomb structure and the plate electrodes on the opposite outer surfaces thereof. However, in the case that the apparatus comprises only one set of the honeycomb structure and the plate electrodes on the opposite outer surfaces thereof, the apparatus may consisting of the plate electrode 55 connected to the electric power supply 110, the grounded plate electrode 54, and the insulative honeycomb structure 50 therebetween.

Figure 6A:
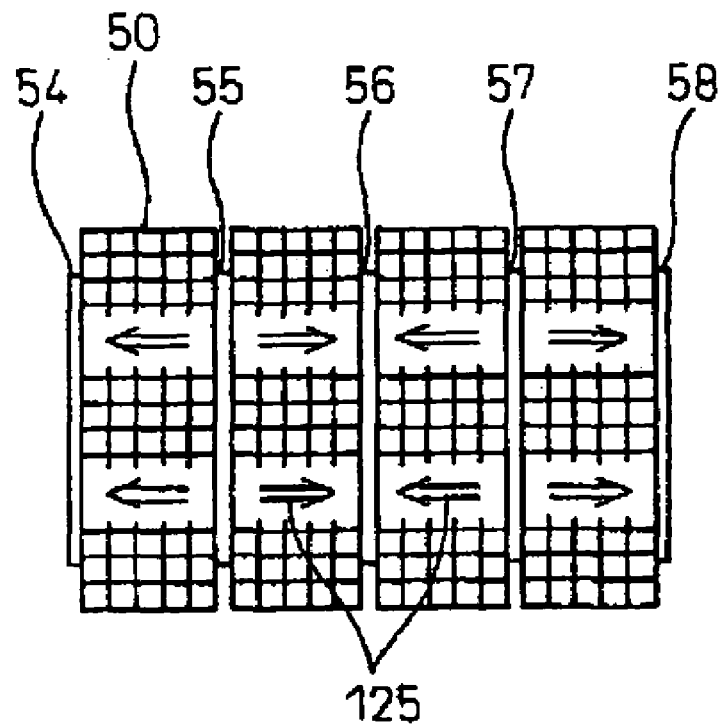
FIGS. 6a and 6b are elevational views of the upstream end of the apparatus shown in FIG. 5.
Figure 6B:
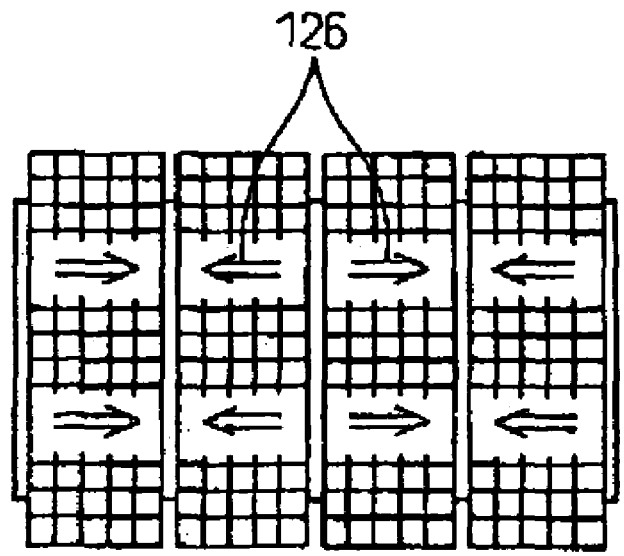

In the use of the exhaust gas purifying apparatus shown in FIGS. 5 to 6b, the electric power supply 110 applies a voltage between the plate electrodes 54, 56 and 58, and the adjacent electrodes 55 and 57 to generate an electric field 125 or 126 in the honeycomb structure 50. For example, the plate electrodes 55 and 57 are used as anodes while the plate electrodes 54, 56 and 58 are used as cathodes in order to generate an electric field in a direction indicated by the arrow 125 of FIG. 6a. If the anodes and cathodes are switched, an electric field in a direction indicated by the arrow 126 of FIG. 6b is generated in the honeycomb structure 50. In any case, the electric field crosses the cell passages of the honeycomb structure 50 through which an exhaust gas flows. The electric field 125 or 126 forces the PM in the exhaust gas to be deposited onto the sidewall of the cell passages of the honeycomb structure 50 by the Coulomb force in order to improve a trapping of the PM.

The components of the exhaust gas purifying apparatus shown in FIGS. 5 to 6b are described below in more detail.

The plate electrodes 54 to 58 may be made of the materials described above for the center electrode 14 and the outer electrode 16 of FIGS. 1a and 1b. Though the plate electrodes 54 to 58 of the apparatus shown in FIGS. 5 to 6b are mesh electrodes, the plate electrodes may be foil or solid plate of these materials and be made by applying a conductive paste on the surface of the honeycomb structure 50. The insulative honeycomb structure 50, the electric power supply 110, materials carried on the honeycomb structure 50 are similar to those described for the apparatus of FIGS. 1a and 1b.

[Apparatus 5]

Figure 7:
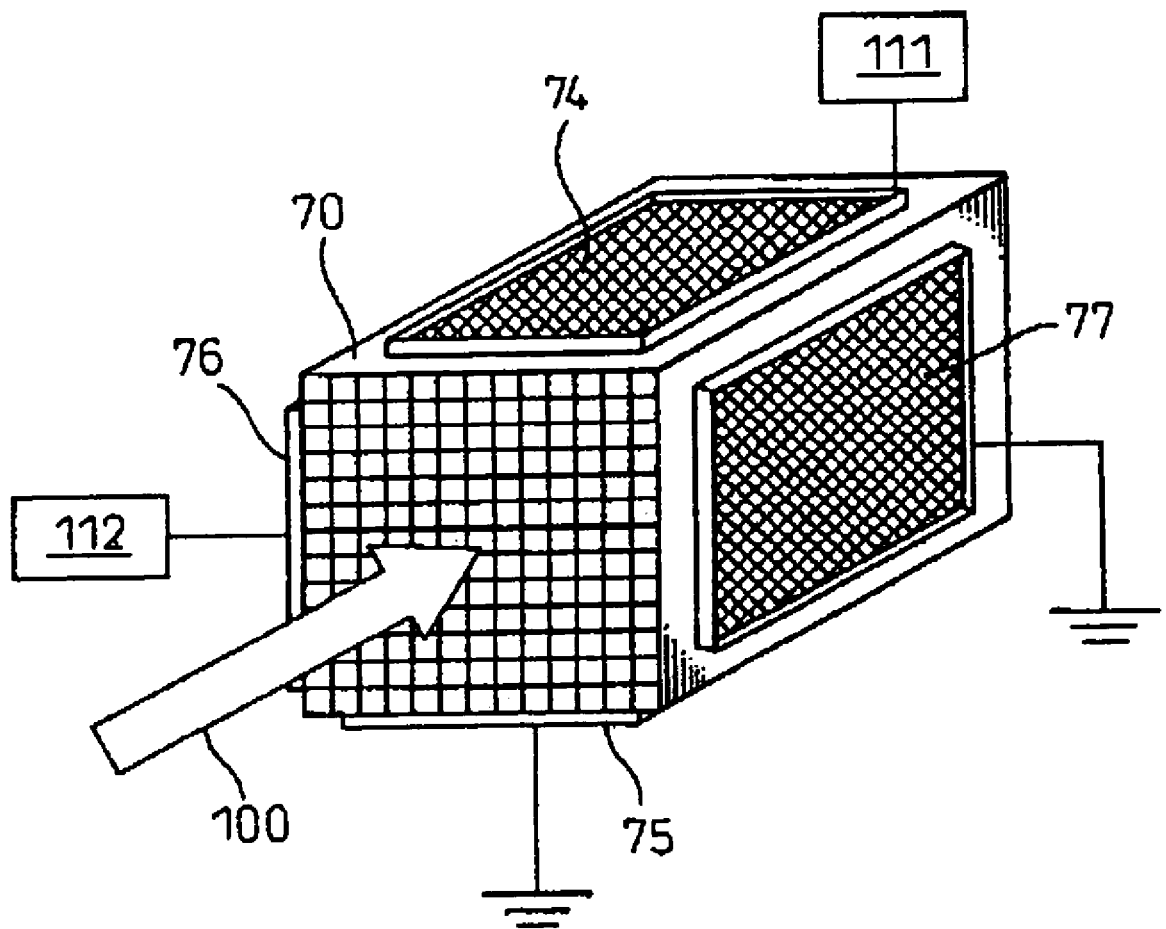
FIG. 7 is a perspective view of the exhaust gas purifying apparatus according to the fifth embodiment of the present invention.
Figure 8A:
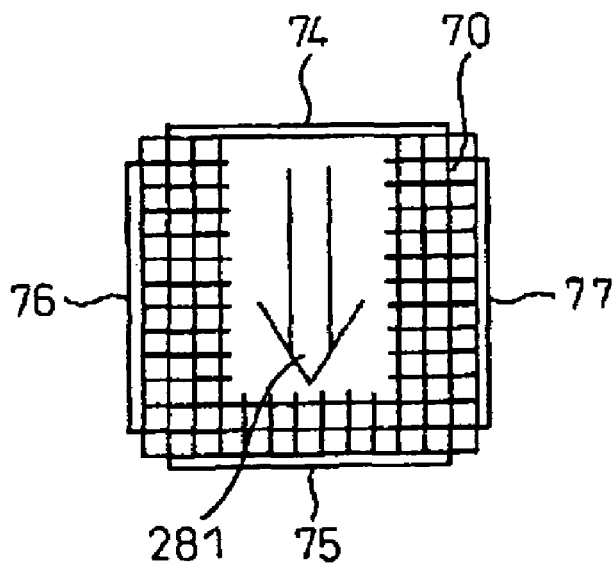
FIGS. 8a to 8d are elevational views of the upstream end of the apparatus shown in FIG. 7.
Figure 8B:
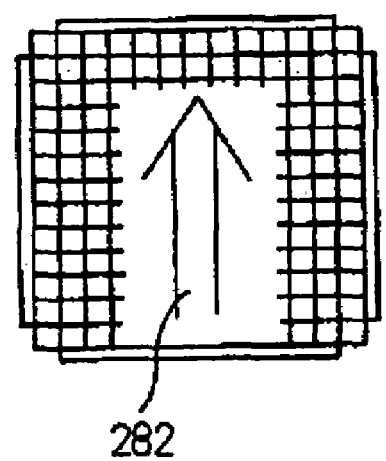
Figure 8C:
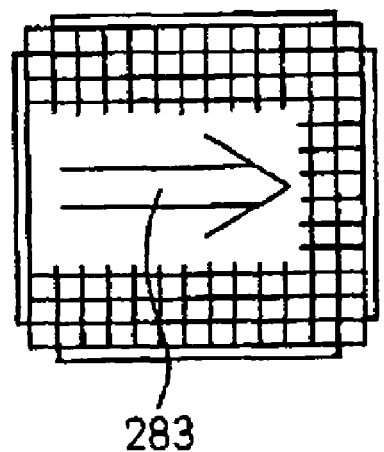
Figure 8D:
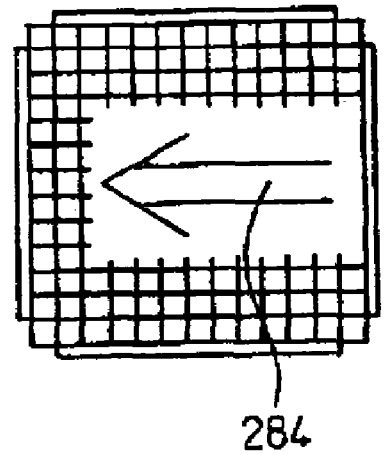
Figure 9A:
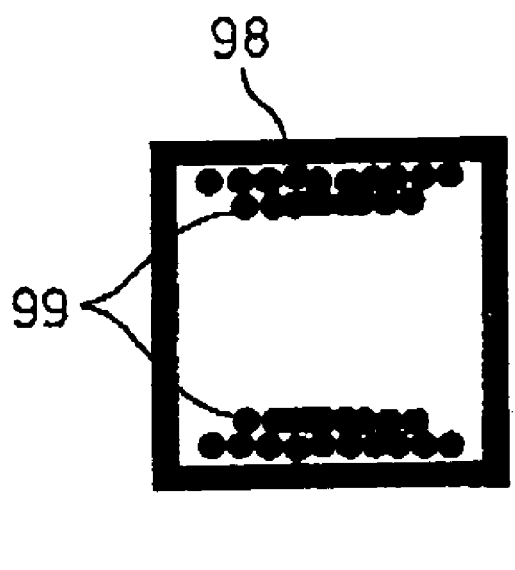
FIGS. 9a and 9b are enlarged elevational views of a cell passage of the apparatus shown in FIG. 7.
Figure 9B:
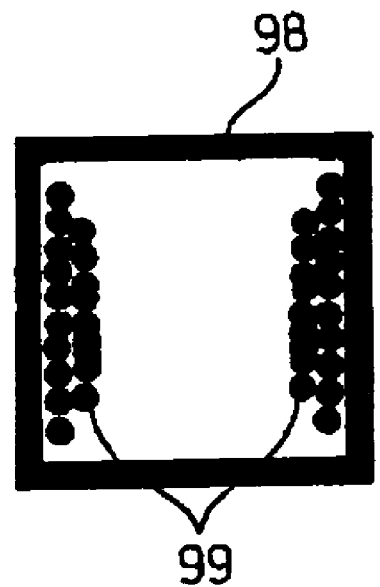

The fifth embodiment of the present exhaust gas purifying apparatus is described below. FIG. 7 shows a perspective view of the apparatus, FIGS. 8a to 8d show front elevational views of the apparatus, and FIGS. 9a and 9b show an enlarged elevational views of a cell passage of the honeycomb structure of the apparatus.

In FIGS. 7 to 8d, 70 indicates a straight-flow type insulative honeycomb structure having a number of cell passages, 74 to 77 indicate mesh plate electrodes, and 111 and 112 indicate electric power supplies. The plate electrodes 74 to 77 are insulated one another by the insulative honeycomb structure 70 therebetween. Among the plate electrodes 74 to 77, the plate electrodes 74 and 76 are respectively connected to the electric power supply 111 and 112, and the other plate electrodes 75 and 77 are grounded. An exhaust gas containing PM passes through the cell passages of the insulative honeycomb structures 70 surrounded by the plate electrodes 74 to 77, as shown in an arrow 100. In FIGS. 9a and 9b, 98 indicates a sidewall of the cell passages of honeycomb structure 70, and 99 indicates the PM deposited on the sidewall.

In the use of the exhaust gas purifying apparatus shown in FIGS. 7 to 9b, the electric power supply 111 applies a voltage between the opposite plate electrodes 74 and 75 to generate an electric field therebetween, and the electric power supply 112 applies a voltage between the opposite plate electrodes 76 and 77 to generate an electric field therebetween. For example, the plate electrode 74 is used as an anode while the plate electrode 75 is used as a cathode in order to generate an electric field in a direction indicated by the arrow 281 in the honeycomb structure 70 of FIG. 8a. Further, the plate electrode 76 is used as an anode while the plate electrode 77 is used as a cathode in order to generate an electric field in a direction indicated by the arrow 283 in the honeycomb structure 70 of FIG. 8c. If the anode and the cathode are switched in these cases, electric fields goes in a direction indicated by the arrows 282 and 284 of FIGS. 8b and 8d. In any cases, the electric field crosses the cell passages of the honeycomb structure 70 through which an exhaust gas flows. By the Coulomb force, the electric field forces the PM in the exhaust gas to be deposited onto the sidewall of the cell passages of the honeycomb structure in order to improve the trapping of the PM.

The alternative electric fields in two different directions shows the following effect. In the FIGS. 9a and 9b, 98 indicates sidewalls of the cell passage of the honeycomb structure, and 99 indicates the PM deposited on the sidewall 98. In the case that the electric field 281 or 282, i.e. the downward or upward electric field, is generated in the honeycomb structure 70, the PM in the exhaust gas flow preferentially deposits onto the lower or upper surface of the sidewall as shown in FIG. 9a. In such a period, the PM on the vertical surfaces of the sidewall is burned by the thermal energy of the exhaust gas and an electric current therethrough. In the case that the electric field 283 or 284, i.e. the rightward or leftward electric field, is generated in the honeycomb structure 70, the PM in the exhaust gas flow preferentially deposits onto the right or left surface of the sidewall as shown in FIG. 9b. In such a period, the PM on the horizontal surfaces of the sidewall is burned by the thermal energy of the exhaust gas and an electric current therethrough.

Due to switching of the directions of the electric field in the honeycomb structure, the PM in the exhaust gas flow may be evenly deposit on the sidewalls of the cell passages of the honeycomb structure. Further, if the PM is preferentially electrostatically charged in either of positive or negative and preferentially deposits on the either of upper and lower surfaces or either of right and left surfaces of the sidewall, it is possible to evenly deposit the PM on the sidewall by switching the direction of the electric field as shown in FIGS. 8a and 8b or FIGS. 8c and 8d.

The components of the exhaust gas purifying apparatus shown in FIGS. 7 to 9b are described below in more detail.

The plate electrodes 74 to 77 may be made of the materials described above for the center electrode 14 and the outer electrode 16 of FIGS. 1a and 1b. The insulative honeycomb structure 70, the electric power supply 110, and the materials carried on the honeycomb structure 70 are similar to those described for the apparatus of FIGS. 1a and 1b.

The effects of the present invention are shown with regard to the examples, which are not intended to limit the scope of the present invention shown in the claims.

EXAMPLES 1 TO 5

Example 1

Figure 4A:
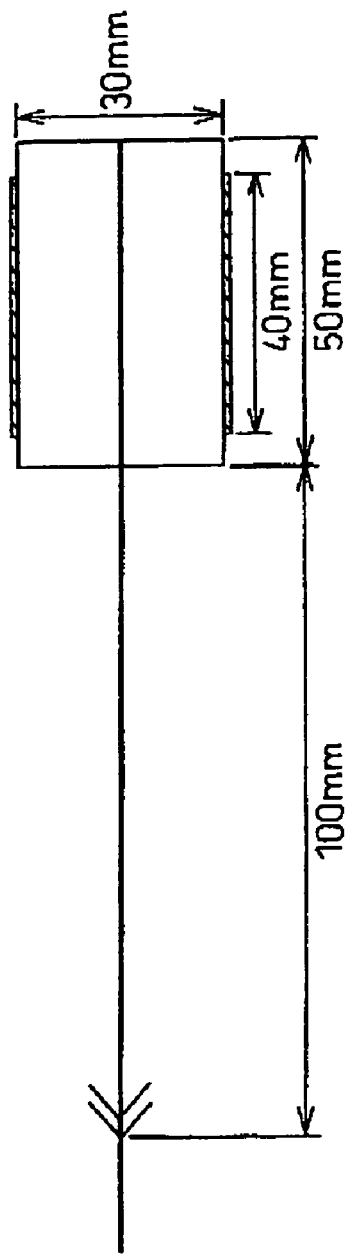
FIGS. 4a to 4c are sectional views of the exhaust gas purifying apparatus used in examples.

An exhaust gas purifying apparatus was provided according to the first embodiment of the present invention shown in FIGS. 1a and 1b. That is, around the circumference surface of a straight-flow type cordierite honeycomb structure (diameter: 30 mm and length: 50 mm, cell density: 200 cells/square inch, porosity: 65%, and average pore size: 25 μm (micro meters)), a stainless steel mesh (width: 40 mm, SUS 304, 300 mesh) was surrounded to be an outer electrode. On the center axis of the honeycomb structure, a center electrode (bar electrode) having needle electrodes was fixed. The exhaust gas purifying apparatus used for this example is shown in FIG. 4a.

Example 2

The exhaust gas purifying apparatus of this example was the same as that of the example 1, except that a wall-flow type cordierite honeycomb structure (cell density: 300 cells/square inch, porosity: 65%, and average pore size: 25 μm) was used in place of the straight-flow type cordierite honeycomb of the example 1.

Example 3

The exhaust gas purifying apparatus of this example was the same as that of the example 1, except that the honeycomb structure carries 4.0 g of a $CeO_2$ powder and Pt (2 wt % on the basis of the amount of the $CeO_2$ powder), the $CeO_2$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Example 4

The exhaust gas purifying apparatus of this example was the same as that of the example 1, except that the honeycomb structure carries 4.0 g of a $CeO_2$ powder and Fe (2 wt % on the basis of the amount of the $CeO_2$ powder), the $CeO_2$ powder being carried by wash coating and firing the honeycomb structure for 2 hours at the temperature of 450° C., and then the Fe being carried by impregnating a $Fe(NO_3)_3$ aqueous solution into the honeycomb structure, drying and firing the obtained honeycomb structure for 2 hours at the temperature of 450° C.

Example 5

The exhaust gas purifying apparatus of this example was the same as that of the example 1, except that the honeycomb structure carries 4.0 g of a $Al_2O_3$ powder and Pt (2 wt % on the basis of the amount of the $Al_2O_3$ powder), the $Al_2O_3$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Performance Evaluation: PM Trapping

Each of the apparatuses of the examples 1 to 5 was surrounded by an alumina mat, and inserted in a quartz tube having an inner diameter of 37 mm (milli-meters). The center electrode was electrically connected to an electric power supply, and the outer electrode was grounded. To the exhaust gas purifying apparatus, a part of the exhaust gas (100 L/minute) from a direct-injection system diesel engine having a displacement volume of 2400 cc was pumped, and a voltage of 4 kV (input electric power of about 3 W) was applied. Contents of the PM in the exhaust gas were determined at the upstream and downstream of the apparatus by the use of ELPI (Electric Low Pressure Impactor). A PM purifying rate was determined from the difference between the contents of the PM at the upstream and downstream of the apparatus. The higher this value is, the superior the performance of the apparatus is. In all case, the engine was in idling (700 rpm).

Performance Evaluation: PM Oxidization

After sufficiently depositing PM in the honeycomb structures of the examples 1 to 5, the honeycomb structures were dried for 24 hours at the temperature of 120° C. in a dryer, and then weighed. The obtained weight is an initial weight. The each apparatus was inserted in the quartz tube as stated above (atmosphere: air), and the center electrode was power at 15 kV for 15 minutes. The resulted honeycomb structure was dried for 24 hours at the temperature of 120° C., and then weighed. The obtained weight is an after-treatment weight. The PM oxidation amount is obtained from the difference between the initial weight and the after-treatment weight. The PM oxidation energy was calculated by dividing the PM oxidation amount by the input energy (voltage×electric current×time) from the electric power supply. The lower this value is, the superior the PM oxidation performance is. The input energy required for oxidizing PM by mere heating is about 290 kJ/g.

TABLE 1

| | PM trapping | | |
| --- | --- | --- | --- |
| | with electric field (%) | without electric field (%) | PM oxidation energy (kJ/g) |
| Ex. 1 (No catalyst straight-flow) | 11 | 69 | 65 |
| Ex. 2 (No catalyst wall-flow) | 45 | 68 | 67 |
| Ex. 3 (Pt/CeO$_2$ straight-flow) | 12 | 69 | 45 |
| Ex. 4 (Fe/CeO$_2$ straight-flow) | 12 | 67 | 49 |
| Ex. 5 (Pt/Al$_2$O$_3$ straight-flow) | 13 | 70 | 44 |

The PM trapping performances in Table 1 show that the electric field in the honeycomb structure improves the PM trapping, and that the straight-flow type and wall-flow type honeycomb structures achieve the similar PM trapping results on being provided with the electric power. The PM oxidizing performances in the table 1 show that the electric current reduces the required PM oxidation energy relative to mere heating, and that the PM oxidation catalysts further reduce the required PM oxidation energy.

EXAMPLES 6 TO 9

Example 6

Figure 4B:
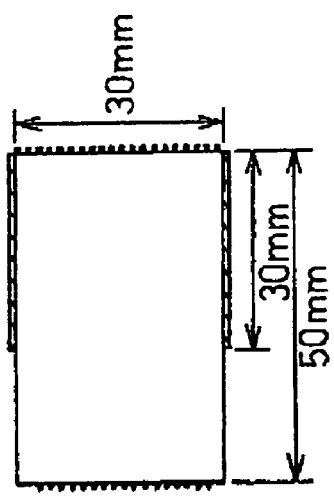

An exhaust gas purifying apparatus was provided according to the second embodiment of the present invention shown in FIGS. 2a and 2b. That is, on the upstream end and downstream end of a straight-flow type cordierite honeycomb structure (diameter: 30 mm, length: 50 mm, cell density: 200 cells/square inch, porosity; 65%, and average pore size; 25 µm), stainless steel meshes in the circular form (diameter: 25 mm, SUS 304, 30 mesh) were fixed to be an upstream mesh electrode and a downstream mesh electrode, respectively. Further, around the circumference surface of the honeycomb structure, a stainless steel mesh (width: 30 mm, SUS 304, 300 mesh) was surrounded to be an outer electrode. The exhaust gas purifying apparatus used for this example is shown in FIG. 4b.

Example 7

The exhaust gas purifying apparatus of this example was the same as that of the example 6, except that the honeycomb structure carries 4.0 g of a CeO$_2$ powder and Pt (2 wt % on the basis of the amount of the CeO$_2$ powder), the CeO$_2$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Example 8

The exhaust gas purifying apparatus of this example was the same as that of the example 6, except that the honeycomb structure carries 4.0 g of a CeO$_2$ powder and Fe (2 wt % on the basis of the amount of the CeO$_2$ powder), the CeO$_2$ powder being carried by wash coating and firing the honeycomb structure for 2 hours at the temperature of 450° C., and then the Fe being carried by impregnating a Fe(NO$_3$)$_3$ aqueous solution into the honeycomb structure, drying and firing the obtained honeycomb structure for 2 hours at the temperature of 450° C.

Example 9

The exhaust gas purifying apparatus of this example was the same as that of the example 6, except that the honeycomb structure carries 4.0 g of a Al$_2$O$_3$ powder and Pt (2 wt % on the basis of the amount of the Al$_2$O$_3$ powder), the Al$_2$O$_3$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Performance Evaluation: PM Trapping

Each of the apparatuses of the examples 6 to 9 was surrounded by an alumina mat and inserted in a quartz tube having an inner diameter of 37 mm. The upstream electrode was electrically connected to an electric power supply, and the downstream mesh electrode and the outer electrode were grounded. To the exhaust gas purifying apparatus, a part of the exhaust gas (100 L/minute) from a direct-injection system diesel engine having a displacement volume of 2400 cc was pumped, and a voltage of 4 kV (input electric power of about 3 W) was applied. Contents of the PM in the exhaust gas were determined at the upstream and downstream of the apparatus by the use of ELPI. A PM purifying rate was determined from the difference between the PM contents at the upstream and downstream of the apparatus. The higher this value is, the superior the performance of the apparatus is. In all cases, the engine was idling (700 rpm).

Performance Evaluation: PM Oxidization

After sufficiently depositing PM in the honeycomb structures of the examples 6 to 9, the honeycomb structures were dried for 24 hours at the temperature of 120° C. in a dryer, and then weighed. The obtained weight is an initial weight. The each apparatus was inserted in the quartz tube as stated above (atmosphere: air), and the electrodes were powered at 15 kV for 15 minutes. The resulted honeycomb structure was dried for 24 hours at the temperature of 120° C., and then weighed. The obtained weight is an after-treatment weight. The PM oxidation amount is obtained from the difference between the initial weight and the after-treatment weight. The PM oxidation energy was calculated by dividing the PM oxidation amount by the input energy (voltage×electric current×time) from the electric power supply. The lower this value is, the superior the PM oxidation performance is. The input energy required for oxidizing PM by mere heating is about 290 kJ/g.

TABLE 2

| | PM trapping | | |
|---|---|---|---|
| | with electric field (%) | without electric field (%) | PM oxidation energy (kJ/g) |
| Ex. 6 (No catalyst) | 16 | 69 | 69 |
| Ex. 7 (Pt/CeO$_2$) | 17 | 70 | 44 |
| Ex. 8 (Fe/CeO$_2$) | 17 | 69 | 46 |
| Ex. 9 (Pt/Al$_2$O$_3$) | 18 | 68 | 44 |

The PM trapping performances in the table 2 show that the electric field in the honeycomb structure improves the PM trapping. The PM oxidizing performances in the table 2 show that the electric current reduces the required PM oxidation energy relative to mere heating, and that the PM oxidation catalysts further reduce the required PM oxidation energy.

In the case that the exhaust gas purifying apparatuses of the examples 6 to 9 were used without the outer electrode, i.e. these apparatuses were powered only at the upstream mesh electrode and the downstream electrode to generate an electric field parallel to the direction of the cell passages of the honeycomb structure, the PM trapping was not sufficient, e.g. about 25%. This shows an effect of the electric field that is non-parallel with the direction of the cell passages of the honeycomb structure.

EXAMPLES 10 TO 13

Example 10

Figure 4C:
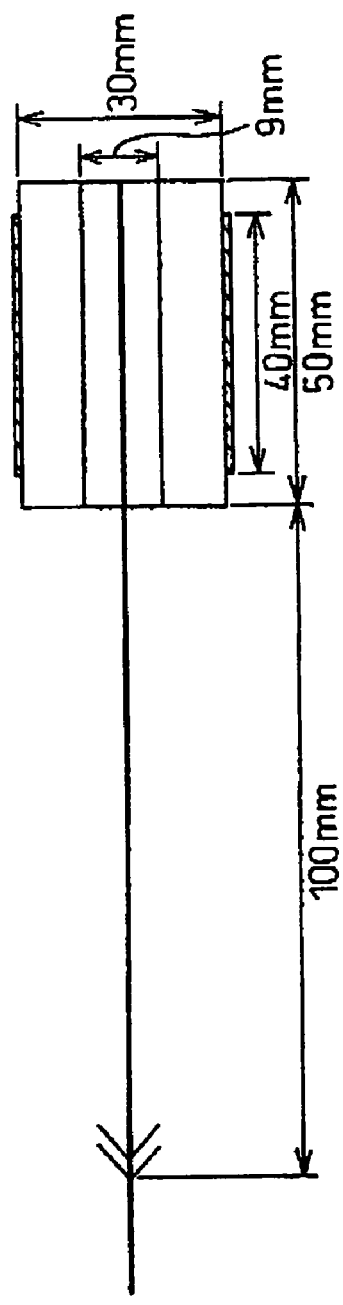

An exhaust gas purifying apparatus was provided according to the third embodiment of the present invention shown in FIGS. 3a and 3b. That is, a perforated hole (diameter: 9 mm, length: 50 mm) was provided at the center area of a wall-flow type cordierite honeycomb structure (diameter: 30 mm, length: 50 mm, cell density: 200 cells/square inch, porosity: 65%, and average pore size: 25 μm). Further, around the circumference surface of the honeycomb structure, a stainless steel mesh (width: 40 mm, SUS 304, 300 mesh) was surrounded to be an outer electrode. On the center axis of the honeycomb structure, a center electrode (bar electrode) having needle electrodes was fixed. The exhaust gas purifying apparatus used for this example is shown in FIG. 4c.

Example 11

The exhaust gas purifying apparatus of this example was the same as that of the example 10, except that the honeycomb structure carries 4.0 g of a CeO$_2$ powder and Pt (2 wt % on the basis of the amount of the CeO$_2$ powder), the CeO$_2$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Example 12

The exhaust gas purifying apparatus of this example was the same as that of the example 10, except that the honeycomb structure carries 4.0 g of a CeO$_2$ powder and Fe (2 wt % on the basis of the amount of the CeO$_2$ powder), the CeO$_2$ powder being carried by wash coating and firing the honeycomb structure for 2 hours at the temperature of 450° C., and then the Fe being carried by impregnating a Fe(NO$_3$)$_3$ aqueous solution into the honeycomb structure, drying and firing the obtained honeycomb structure for 2 hours at the temperature of 450° C.

Example 13

The exhaust gas purifying apparatus of this example was the same as that of the example 10, except that the honeycomb structure carries 4.0 g of a Al$_2$O$_3$ powder and Pt (2 wt % on the basis of the amount of the Al$_2$O$_3$ powder), The Al$_2$O$_3$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Performance Evaluation: PM Trapping

Each of the apparatuses of the examples 10 to 13 was surrounded by an alumina mat and inserted in a quartz tube having an inner diameter of 37 mm. The center electrode was electrically connected to an electric power supply, and the outer electrode were grounded. To the exhaust gas purifying apparatus, a part of the exhaust gas (100 L/minute) from a direct-injection system diesel engine having a displacement volume of 2400 cc was pumped, and a voltage of 4 kV (input electric power of about 3 W) was applied. Contents of the PM in the exhaust gas were determined at the upstream and downstream of the apparatus by the use of ELPI. A PM purifying rate was determined from the difference between the PM contents at the upstream and downstream of the apparatus. The higher this value is, the more superior the performance of the apparatus is. In all case, the engine was in idling (700 rpm).

Performance Evaluation: PM Oxidization

After sufficiently depositing PM in the honeycomb structures of the examples 10 to 13, the honeycomb structures were dried for 24 hours at the temperature of 120° C. in a dryer, and then weighed. The obtained weight is an initial weight. The each apparatus was inserted in the quartz tube as stated above (atmosphere: air), and the electrodes were powered at 15 kV for 15 minutes. The resulted honeycomb structure was dried for 24 hours at the temperature of 120° C., and then weighed. The obtained weight is an after-treatment weight. The PM oxidation amount is obtained from the difference between the initial weight and the after-treatment weight. The PM oxidation energy was calculated by dividing the PM oxidation amount by the input energy (voltage×electric current×time) from the electric power supply. The lower this value is, the more superior the PM oxidation performance is. The input energy required for oxidizing PM by mere heating is about 290 kJ/g.

TABLE 3

| | PM trapping | | |
|---|---|---|---|
| | with electric field (%) | without electric field (%) | PM oxidation energy (kJ/g) |
| Ex. 10 (No catalyst) | 19 | 60 | 145 |
| Ex. 11 (Pt/CeO$_2$) | 20 | 62 | 138 |

TABLE 3-continued

| | PM trapping | | |
|---|---|---|---|
| | with electric field (%) | without electric field (%) | PM oxidation energy (kJ/g) |
| Ex. 12 (Fe/CeO$_2$) | 21 | 59 | 140 |
| Ex. 13 (Pt/Al$_2$O$_3$) | 23 | 57 | 140 |

The PM trapping performances in the table 3 show that the electric field in the honeycomb structure improves the PM trapping. The PM oxidizing performances in the table 3 show that the electric current reduces the required PM oxidation energy relative to heating, and that the PM oxidation catalysts further reduce the required PM oxidation energy.

EXAMPLES 14 TO 19

Example 14

An exhaust gas purifying apparatus was provided according to the forth embodiment of the present invention shown in FIG. 5. That is, straight-flow type cordierite honeycomb structures in rectangular parallelepiped form (cell density: 200 cells/square inch, porosity: 65%, average pore size: 25 μm, height: 15 cells, width: 5 cells, and length: 50 mm) are sandwiched with stainless steel mesh electrodes (SUS 304, height of 24 mm, length of 45 mm, and 300 or 30 mesh). The exhaust gas purifying apparatus used for this example is shown in FIG. 10a.

Figure 10A:
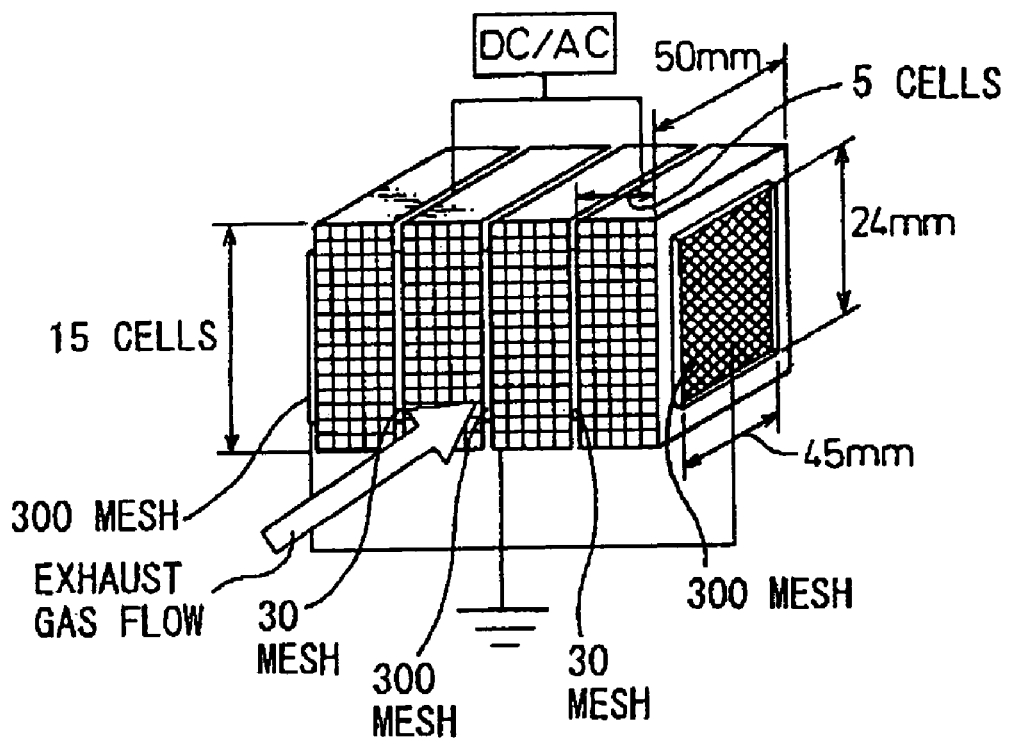
FIGS. 10a and 10b are perspective views of the exhaust gas purifying apparatuses used in examples.

In the experiment, the exhaust gas passes through the apparatus in a direction indicated by an arrow in FIG. 10a. The mesh electrodes are alternatively connected to an electric power supply and to the ground. The electrodes connected to the electric power supply are anodes, and the grounded electrodes are cathodes.

Example 15

The exhaust gas purifying apparatus of this example was the same as that of the example 14, except that the honeycomb structure carries 1.5 g of a CeO$_2$ powder and Fe (2 wt % on the basis of the amount of the CeO$_2$ powder), the CeO$_2$ powder being carried by wash coating and firing the honeycomb structure for 2 hours at the temperature of 450° C., and then the Fe being carried by impregnating a Fe(NO$_3$)$_3$ aqueous solution into the honeycomb structure, drying and firing the obtained honeycomb structure for 2 hours at the temperature of 450° C.

Example 16

The exhaust gas purifying apparatus of this example was the same as that of the example 14, except that the honeycomb structure carries 1.5 g of a Al$_2$O$_3$ powder and Pt (2 wt % on the basis of the amount of the Al$_2$O$_3$ powder), the Al$_2$O$_3$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Example 17

The exhaust gas purifying apparatus of this example was the same as that of the example 14, except that all mesh electrodes have a mesh size of 300 mesh and an AC electric power supply is used as an electric power supply to alternatively switch the direction of the electric field in the honeycomb structure.

Example 18

The exhaust gas purifying apparatus of this example was the same as that of the example 17, except that the honeycomb structure carries Fe/CeO$_2$ as described in Example 15.

Example 19

The exhaust gas purifying apparatus of this example was the same as that of the example 17, except that the honeycomb structure carries Pt/Al$_2$O$_3$ as described in Example 16.

Performance Evaluation: PM Trapping

Each of the apparatuses of the examples 14 to 19 was surrounded by an alumina mat and inserted in an acrylic tube having a profile of 34×48 mm. To the apparatus, a part of the exhaust gas (100 L/minute) from a direct-injection system diesel engine having a displacement volume of 2400 cc was pumped, and a DC electric power of 4 kV and about 3 W (Examples 14 to 16) or an AC electric power of 4 kV and 60 Hz (Examples 17 to 19) was applied.

The contents of the PM in the exhaust gas were determined at the upstream and downstream of the apparatus by the use of ELPI. A PM purifying rate was determined from the difference between the contents of the PM at the upstream and downstream of the apparatus. The higher this value is, the more superior the performance of the apparatus is. In all cases, the engine was in idling (700 rpm).

Performance Evaluation: PM Oxidization

After sufficiently depositing PM in the honeycomb structures of the examples 14 to 19, the honeycomb structures were dried for 24 hours at the temperature of 120° C. in a dryer, and then weighed. The obtained weight is an initial weight. The each apparatus was inserted in the acrylic tube as stated above (atmosphere: air), and powered at 10 kV for 20 minutes. The resulted apparatus was dried for 24 hours at the temperature of 120° C., and then weighed. The obtained weight is an after-treatment weight. The PM oxidation amount is obtained from the difference between the initial weight and the after-treatment weight. The PM oxidation energy was calculated by dividing the PM oxidation amount by the input energy (voltage×electric current×time) from the electric power supply. The lower this value is, the superior the PM oxidation performance is. The input energy required for oxidizing PM by mere heating is about 290 kJ/g.

TABLE 4

| | PM trapping | | |
|---|---|---|---|
| | with electric field (%) | without electric field (%) | PM oxidation energy (kJ/g) |
| Ex. 14 | 19 | 67 | 70 |
| Ex. 15 | 20 | 69 | 39 |
| Ex. 16 | 21 | 68 | 42 |

TABLE 4-continued

| | PM trapping | | |
|---|---|---|---|
| | with electric field (%) | without electric field (%) | PM oxidation energy (kJ/g) |
| Ex. 17 | 19 | 60 | 80 |
| Ex. 18 | 20 | 62 | 51 |
| Ex. 19 | 21 | 64 | 48 |

The PM trapping performances in the table 4 show that the electric field in the honeycomb structure improves the PM trapping. The PM oxidizing performances in the table 4 show that the electric current reduces the required PM oxidation energy relative to mere heating, and that the PM oxidation catalysts further reduce the required PM oxidation energy.

EXAMPLES 20 AND 21

Example 20

An exhaust gas purifying apparatus was provided according to the fifth embodiment of the present invention shown in FIG. 7. That is, straight-flow type cordierite honeycomb structures in rectangular parallelepiped form (cell density: 200 cells/square inch, porosity: 65%, average pore size: 25 μm, height: 15 cells, width: 15 cells, length: 50 mm) are surrounded with four stainless steel mesh electrodes (SUS 304, height: 20 mm, length: 40 mm, and 300 or 30 mesh) on the surfaces thereof which is parallel to the direction of the cell passages. The exhaust gas purifying apparatus used for this example is shown in FIG. 10*b*.

Figure 10B:
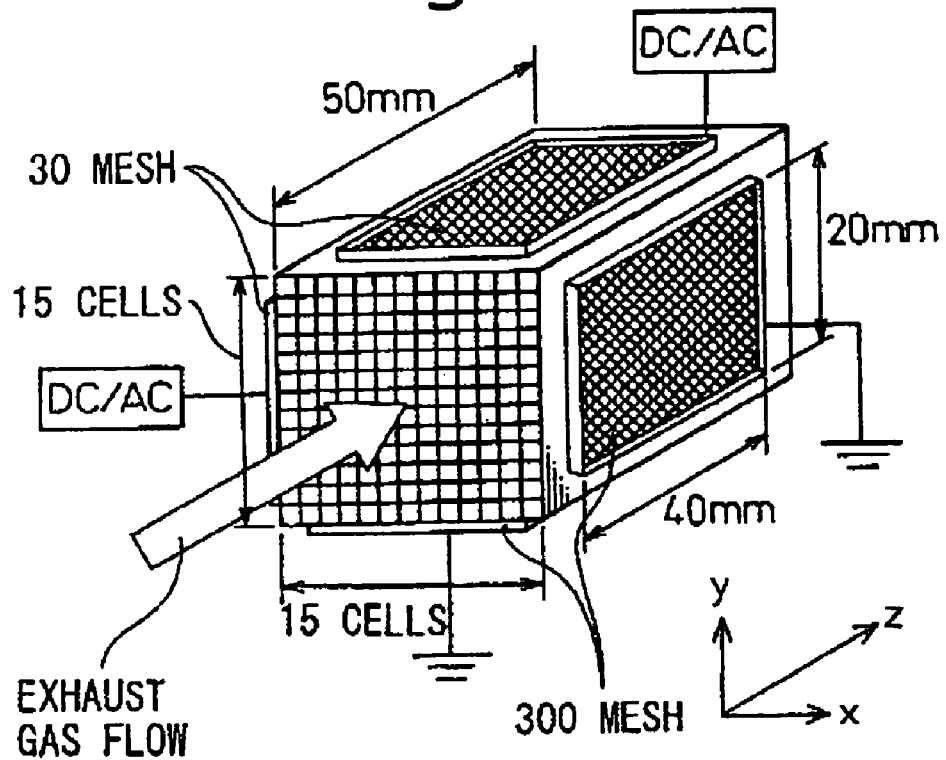

In the experiment, the exhaust gas passes through the apparatus in a direction indicated by an arrow in FIG. 10*b*. The two of the mesh electrodes are connected to a DC electric power supply and the others are to the ground. The electrodes connected to the electric power supply are anode, and the grounded electrodes are cathode.

Example 21

The exhaust gas purifying apparatus of this example was the same as that of the example 20, except that the all mesh electrodes have a mesh size of 300 mesh and that an AC electric power supply was used to alternatively switched the direction of the electric field in the honeycomb structure.

Performance Evaluation: PM Trapping

Each of the apparatuses of the examples 20 and 21 was surrounded by an alumina mat and inserted in an acrylic tube having a profile of 34×48 mm. To the apparatus, a part of the exhaust gas (100 L/minute) from a direct-injection system diesel engine having a displacement volume of 2400 cc was pumped, and a DC electric power of 10 kV and about 7.5 W (Example 20) or an AC electric power of 10 kV and 60 Hz (Example 21) was applied. The direction of the electric fields were alternatively switched between x and y directions of FIG. 10*b* every 10 seconds.

The contents of the PM in the exhaust gas were determined at the upstream and downstream of the apparatus by the use of ELPI. A PM purifying rate was determined from the difference between the contents of the PM at the upstream and downstream of the apparatus. The higher this value is, the more superior the performance of the apparatus is. In all cases, the engine was idling (700 rpm).

Performance Evaluation: PM Oxidization

After sufficiently depositing PM in the honeycomb structures of the examples 20 and 21, the honeycomb structures were dried for 24 hours at the temperature of 120° C. in a dryer, and then weighed. The obtained weight is an initial weight. The each apparatus was inserted in the acrylic tube as stated above (atmosphere: air), and powered at 10 kV for 20 minutes. The resulted apparatus was dried for 24 hours at the temperature of 120° C., and then weighed. The obtained weight is an after-treatment weight. The PM oxidation amount is obtained from the difference between the initial weight and the after-treatment weight. The PM oxidation energy was calculated by dividing the PM oxidation amount by the input energy (voltage×electric current×time) from the electric power supply. The lower this value is, the more superior the PM oxidation performance is. The input energy required for oxidizing PM by mere heating is about 290 kJ/g.

TABLE 5

| | PM trapping | | |
|---|---|---|---|
| | with electric field (%) | without electric field (%) | PM oxidation energy (kJ/g) |
| Ex. 20 | 19 | 69 | 79 |
| Ex. 21 | 21 | 68 | 77 |

The PM trapping performances in the table 5 show that the electric field in the honeycomb structure improves the PM trapping. The PM oxidizing performances in the table 5 show that the electric current reduces the required PM oxidation energy relative to heating, and that the PM oxidation catalysts further reduce the required PM oxidation energy.

EXAMPLES 22 AND 23

The examples 22 and 23 show that the combination of the electric power and the alkali or alkali earth metal carried on the honeycomb structure reduces a required PM oxidation energy. For the purpose of the comparison, a control example A was prepared. In these examples 22, 23 and A, around the circumference surface of a straight-flow type cordierite honeycomb structure (diameter: 30 mm, length: 50 mm, cell density: 200 cells/square inch, porosity: 65%, and average pore size: 25 μm), a stainless steel mesh (width: 40 mm, SUS 304, 300 mesh) was surrounded to be an outer electrode. On the center axis of the honeycomb structure, a center electrode (bar electrode) having needle electrodes was fixed. The exhaust gas purifying apparatus used for these examples is shown in FIG. 4*a*.

Example A

In this example, the honeycomb structure carries 4.0 g of a $Al_2O_3$ powder and Pt (2 wt % on the basis of the amount of a $Al_2O_3$ powder), the $Al_2O_3$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Example 22

The exhaust gas purifying apparatus of this example is the same as that of the example A, except that the honeycomb structure further carries a 0.07 mol/honeycomb structure of K, the K being carried by impregnating a potassium acetate solution into the honeycomb structure of the example A (Pt/Al$_2$O$_3$), drying and firing the obtained honeycomb structure for 2 hours at the temperature of 550° C.

Example 23

The exhaust gas purifying apparatus of this example is the same as that of the example A, except that the honeycomb structure further carries a 0.07 mol/honeycomb structure of Ba, the Ba being carried by impregnating barium acetate solution into the honeycomb structure of the example A (Pt/Al$_2$O$_3$), drying and firing the obtained honeycomb structure for 2 hours at the temperature of 550° C.

Performance Evaluation: PM Trapping

Each of the apparatuses of the examples A, 22 and 23 was surrounded by an alumina mat and inserted in a quartz tube having an inner diameter of 37 mm. The center electrode was electrically connected to an electric power supply, and the outer electrode was grounded. To the exhaust gas purifying apparatus, a part of the exhaust gas (100 L/minute) from a direct-injection system diesel engine having a displacement volume of 2400 cc was pumped, and a voltage of 4 kV (input electric power of about 3 W) was applied. Contents of the PM in the exhaust gas were determined at the upstream and downstream of the apparatus by the use of ELPI. A PM purifying rate was determined from the difference between the contents of the PM at the upstream and downstream of the apparatus. The higher this value is, the more superior the performance of the apparatus is. In all case, the engine was idling (700 rpm).

Performance Evaluation: PM Oxidization

After sufficiently depositing PM in the honeycomb structures of the examples A, 22 and 23, the honeycomb structures were dried for 24 hours at the temperature of 120° C. in a dryer, and then weighed. The obtained weight is an initial weight. The each apparatus was inserted in the quartz tube as stated above. The center electrode was powered at 15 kV for 15 minutes while the apparatus was heated at the temperature of 250° C. in an electric furnace and a gas mixture containing 10% of O$_2$, 1000 ppm of NO, 15% of CO$_2$ and 10% of H$_2$O was passed through the honeycomb structure. The resulted apparatus was dried for 24 hours at the temperature of 120° C., and then weighed. The obtained weight is an after-treatment weight. The PM oxidation amount is obtained from the difference between the initial weight and the after-treatment weight. The PM oxidation energy was calculated by dividing the PM oxidation amount by the input energy (voltage×electric current×time) from the electric power supply. The lower this value is, the superior the PM oxidation performance is. The input energy required for oxidizing PM by heating is about 290 kJ/g.

TABLE 6

| | PM trapping | | |
|---|---|---|---|
| | with electric field (%) | without electric field (%) | PM oxidation energy (kJ/g) |
| Ex. A | 13 | 70 | 40 |
| Ex. 22 | 13 | 71 | 30 |
| Ex. 23 | 13 | 70 | 34 |

The PM trapping performances in the table 6 show that the electric field in the honeycomb structure improves the PM trapping. The PM oxidizing performances in the table 6 show that the electric current reduces the required PM oxidation energy relative to mere heating, and that the alkali or alkali earth metal (especially K and Ba) carried on the honeycomb structure further reduces the required PM oxidation energy.

EXAMPLES 24 AND 25

The examples 24 and 25 show the combination of an electric current and the alkali or alkali earth metal carried on the honeycomb structure considerably improves PM oxidation. For the purpose of the comparison, a control example A' was prepared.

Example A'

The exhaust gas purifying apparatus of this example was the same as that of the example A (Pt/Al$_2$O$_3$), except that a wall-flow type cordierite honeycomb structure (diameter: 30 mm, length: 50 mm, cell density: 200 cells/square inch, porosity: 65%, and average pore size: 25 μm) was used in place of the straight-flow type cordierite honeycomb structure.

Example 24

The exhaust gas purifying apparatus of this example was the same as that of the example 22, except that the wall-flow type cordierite honeycomb structure (diameter: 30 mm, length: 50 mm, cell density: 200 cells/square inch, porosity: 65%, and average pore size: 25 μm) was used in place of the straight-flow type cordierite honeycomb structure.

Example 25

The exhaust gas purifying apparatus of this example was the same as that of the example 23, except that a wall-flow type cordierite honeycomb structure (diameter: 30 mm, length: 50 mm, cell density: 200 cells/square inch, porosity: 65%, and average pore size: 25 μm) was used in place of the straight-flow type cordierite honeycomb structure.

Performance Evaluation: PM Oxidization

After sufficiently depositing PM in the honeycomb structures of the examples A', 24 and 25, the honeycomb structures were dried for 24 hours at the temperature of 120° C. in a dryer, and then weighed. The obtained weight is an initial weight. The apparatus was surrounded by an alumina mat and inserted in a quartz tube having an inner diameter of 37 mm. The center electrode was powered at 15 kV for 15 minutes, or not, while the apparatus was heated at the temperature of 250° C. in an electric furnace and a gas mixture containing 10% of O$_2$, 1000 ppm of NO, 15% of CO$_2$ and 10% of H$_2$O was passes through the honeycomb structure. The resulted honeycomb structure was dried for 24 hours at the temperature of 120° C., and then weighed. The obtained weight is an after-treatment weight. The PM oxidation amount is obtained from the difference between the initial weight and the after-treatment weight. The higher this value is, the superior the PM oxidation performance is.

TABLE 7

| | PM oxidation amount | | Increase of |
|---|---|---|---|
| | with electric field (g) | without electric field (g) | PM oxidation amount (g) |
| Ex. A' | 0.04 | 0.12 | 0.08 |
| Ex. 24 | 0.08 | 0.26 | 0.18 |
| Ex. 25 | 0.07 | 0.23 | 0.16 |

The increase of PM oxidation amount in the table 7 show that, on applying a voltage, control example A' using Pt/Al$_2$O$_3$ increase the PM oxidation amount by 0.08 g while the examples 24 and 24 respectively using an alkali and alkali earth metal (K and Ba) increase the PM oxidation amount by 0.18 g and 0.16 g (about 2 times). That is, the combination of the alkali or alkali earth metal and electric field significantly accelerates the PM oxidation.

EXAMPLES 26 AND 27

The examples 26 and 27 show that a material which generates oxygen radical by conducting an electric current therethrough improves a required PM oxidation energy. For the purpose of the comparison, above control example A (Pt/$Al_2O_3$) was prepared. The exhaust gas purifying apparatuses used for the examples 26 and 27 are the same as that of the control example A shown in FIG. 4a except for the material carried on the honeycomb structure.

Example 26

In this example, the honeycomb structure carries 4.0 g of $12CaO.7Al_2O_3$ powder, the $12CaO.7Al_2O_3$ powder being carried by wash coating and firing the honeycomb structure for 2 hours at the temperature of 450° C.

Example 27

In this example, the honeycomb structure carries 4.0 g of $12CaO.7Al_2O_3$ powder and Pt (2 wt % on the basis of the amount of $12CaO.7Al_2O_3$ powder), the $12CaO.7Al_2O_3$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Performance Evaluation: PM Trapping and PM Oxidization

The performance evaluation on the PM trapping and the PM oxidization were conducted as described for the examples 22 and 23. The input energy required for oxidizing PM by mere heating is about 290 kJ/g.

TABLE 8

| | PM trapping | | |
| --- | --- | --- | --- |
| | with electric field (%) | without electric field (%) | PM oxidation energy (kJ/g) |
| Ex. A | 13 | 70 | 40 |
| Ex. 26 | 12 | 70 | 35 |
| Ex. 27 | 13 | 69 | 32 |

The PM trapping performances in the table 8 show that the electric field in the honeycomb structure improves the PM trapping. The PM oxidizing performances in the table 8 show that the electric current reduces the required PM oxidation energy relative to mere heating, and that a material that generates an oxygen radical by conducting an electric current therethrough ($12CaO.7Al_2O_3$) carried on the honeycomb structure in alone or combination with Pt further reduces the required PM oxidation energy.

EXAMPLES 28 AND 29

The examples 28 and 29 show that the $MnO_2$ carried on the honeycomb structure reduces a required PM oxidation energy. For the purpose of the comparison, above control example A (Pt/$Al_2O_3$) was conducted. The exhaust gas purifying apparatuses of the examples 28 and 29 are the same as that of the control example A shown in FIG. 4a except for the material carried on the honeycomb structure.

Example 28

In this example, the honeycomb structure carries 4.0 g of $MnO_2$ powder, the $MnO_2$ powder being carried by wash coating and firing the honeycomb structure for 2 hours at the temperature of 450° C.

Example 29

In this example, the honeycomb structure carries 4.0 g of $MnO_2$ powder and Pt (2 wt % on the basis of the amount of $MnO_2$ powder), the $MnO_2$ powder being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Performance Evaluation: PM Trapping and PM Oxidization

The performance evaluation on the PM trapping and the PM oxidization were conducted as described for the examples 22 and 23. The input energy required for oxidizing PM by heating is about 290 kJ/g.

TABLE 9

| | PM trapping | | |
| --- | --- | --- | --- |
| | with electric field (%) | without electric field (%) | PM oxidation energy (kJ/g) |
| Ex. A | 13 | 70 | 40 |
| Ex. 28 | 12 | 71 | 35 |
| Ex. 29 | 13 | 70 | 33 |

The PM trapping performances in the table 9 show that the electric field in the honeycomb structure improves the PM trapping. The PM oxidizing performances in the table 9 show that the electric current reduces the required PM oxidation energy relative to heating, and that the $MnO_2$ powder carried on the honeycomb structure in alone or combination with Pt further reduce the required PM oxidation energy.

EXAMPLES 30 AND 31

The examples 30 and 31 show the effect of a high dielectric constant material on a PM trapping performance. For the purpose of the comparison, above control example A (Pt/$Al_2O_3$) was prepared. The exhaust gas purifying apparatuses of the examples 30 and 31 are the same as that of the control example A shown in FIG. 4a except for the material carried on the honeycomb structure.

Example 30

In this example, the honeycomb structure carries 4.0 g of a 1:1 mixture of $Al_2O_3$ and $BaTiO_3$ powders, and Pt (2 wt % on the basis of the amount of $BaTiO_3$ powder), the 1:1 mixture being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Example 31

In this example, the honeycomb structure carries 4.0 g of a 1:1 mixture of $Al_2O_3$ and $SrTiO_3$ powders, and Pt (2 wt % on the basis of the amount of $SrTiO_3$ powder), the 1:1 mixture being carried by wash coating and firing the honeycomb structure for 2 hours at the temperature of 450° C., and then the Pt being carried by impregnating a Pt dinitrodiammine complex aqueous solution into the honeycomb structure, drying and firing the obtained honeycomb structure for 2 hours at the temperature of 450° C.

Performance Evaluation: PM Trapping and PM Oxidization

The performance evaluation on the PM trapping and the PM oxidization were conducted as described for the examples 22 and 23. The input energy required for oxidizing PM by heating is about 290 kJ/g.

TABLE 10

| | PM trapping | | |
|---|---|---|---|
| | with electric field (%) | without electric field (%) | PM oxidation energy (kJ/g) |
| Ex. A | 13 | 70 | 40 |
| Ex. 30 | 13 | 79 | 48 |
| Ex. 31 | 13 | 78 | 51 |

The PM trapping performances in the table 10 show that the electric field in the honeycomb structure improves the PM trapping, and that the combination of the electric field and the high dielectric constant material, especially $BaTiO_3$ or $SrTiO_3$, further improves the PM trapping. The PM oxidizing performances in the table 10 show that the electric current reduces the required PM oxidation energy relative to mere heating.

Although the present invention has been fully described by way of the example with reference to the accompanying drawings, it should be understood that various changes and modifications will be apparent to those skilled in the art. Therefore, such changes and modifications can be made within the scope of the present invention hereinafter defined.

The invention claimed is:

1. An exhaust gas purifying apparatus for trapping and burning particulate matter (PM), which comprises electrodes and an insulative honeycomb structure having a number of cell passages, wherein the electrodes make an electric field in said honeycomb structure, the electric field not being parallel to the direction of the cell passages of said honeycomb structure, the exhaust purifying gas apparatus further comprising an electric-discharge electrode that extends upstream of an upstream end of the honeycomb structure, the electric-discharge electrode being configured to promote an electric discharge therefrom to charge the PM before the PM enters the honeycomb structure.

2. The exhaust gas purifying apparatus according to claim 1, wherein said electric field is at the angle of at least 45 degree to the cell passages of the honeycomb structure.

3. The exhaust gas purifying apparatus according to claim 1, wherein said honeycomb structure is a straight-flow honeycomb structure.

4. The exhaust gas purifying apparatus according to claim 1, wherein said honeycomb structure carries a PM oxidation catalyst.

5. The exhaust gas purifying apparatus according to claim 4, wherein said PM oxidation catalyst is selected from the group consisting of $CeO_2$, $Fe/CeO_2$, $Pt/CeO_2$ and $Pt/Al_2O_3$, and combination thereof.

6. The exhaust gas purifying apparatus according to claim 1, wherein said electrodes comprise a center electrode and an outer electrode surrounding the center electrode, and said honeycomb structure is positioned between the center electrode and the outer electrode.

7. The exhaust gas purifying apparatus according to claim 1, wherein said electrodes comprise a mesh electrode on the upstream end of said honeycomb structure and an outer electrode around a circumference surface of said honeycomb structure.

8. The exhaust gas purifying apparatus according to claim 7, wherein said electrodes further comprise a second mesh electrode on a downstream end of said honeycomb structure, said second mesh electrode being electrically connected with the outer electrode.

9. The exhaust gas purifying apparatus according to claim 1, wherein said electrodes comprise a center electrode and an outer electrode surrounding the center electrode; said honeycomb structure is positioned between said center electrode and said outer electrode; said center electrode extends beyond the upstream end of said honeycomb structure; and a radially inner area of said honeycomb structure has a lower gas-flow resistivity than that of an outer area thereof.

10. The exhaust gas purifying apparatus according to claim 9, wherein said radially inner area of the honeycomb structure has a perforated hole through the honeycomb structure.

11. The exhaust gas purifying apparatus according to claim 10, wherein a ratio of a diameter of said honeycomb structure to that of said perforated hole is 10:1 to 2:1.

12. The exhaust gas purifying apparatus according to claim 1, wherein said honeycomb structure has opposite outer surfaces, and said electrodes comprise a pair of plate electrodes respectively placed on said opposite outer surfaces of the honeycomb structure.

13. The exhaust gas purifying apparatus according to claim 12, wherein the apparatus comprises two or more sets of said honeycomb structure and said pair of plate electrodes.

14. The exhaust gas purifying apparatus according to claim 1, wherein said honeycomb structure has two pairs of opposite outer surfaces; said electrodes comprise two pairs of opposite plate electrodes; and each pair of the opposite plate electrodes is placed on each pair of the opposite outer surfaces of the honeycomb structure such that said two pairs of opposite plate electrodes alternatively make the electric fields having two different directions which are non-parallel to the direction of the cell passages of the honeycomb structure.

15. The exhaust gas purifying apparatus according to claim 14, wherein said honeycomb structure is in a rectangular parallelepiped form, and said electrodes are positioned on the four outer surfaces thereof which are parallel to the direction of the cell passage.

16. An exhaust gas purifying apparatus according to claim 1, wherein the honeycomb structure carries at least one metal selected from the group consisting of an alkali metal and an alkali earth metal.

17. The exhaust gas purifying apparatus according to claim 16, wherein said at least one metal is potassium or barium.

18. An exhaust gas purifying apparatus according to claim 1, characterized in that the honeycomb structure carries a manganese dioxide.

19. An exhaust gas purifying apparatus according to claim 1, wherein the honeycomb structure carries a material having a high dielectric constant.

20. The exhaust gas purifying apparatus according to claim 19, wherein said material is a material having a static specific dielectric constant of more than 100 at the temperature of 250° C.

21. The exhaust gas purifying apparatus according to claim 19, wherein said material is a barium titanate or strontium titanate.

* * * * *